United States Patent
Gao

(10) Patent No.: US 11,382,077 B2
(45) Date of Patent: Jul. 5, 2022

(54) PUCCH TRANSMISSION METHOD, TERMINAL AND NETWORK-SIDE DEVICE

(71) Applicant: CHINA ACADEMY OF TELECOMMUNICATIONS TECHNOLOGY, Beijing (CN)

(72) Inventor: Xuejuan Gao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 56 days.

(21) Appl. No.: 16/764,830

(22) PCT Filed: Sep. 26, 2018

(86) PCT No.: PCT/CN2018/107560
§ 371 (c)(1),
(2) Date: May 15, 2020

(87) PCT Pub. No.: WO2019/095863
PCT Pub. Date: May 23, 2019

(65) Prior Publication Data
US 2020/0344748 A1 Oct. 29, 2020

(30) Foreign Application Priority Data
Nov. 17, 2017 (CN) .......................... 201711146913.4

(51) Int. Cl.
H04W 4/00 (2018.01)
H04W 72/04 (2009.01)
(Continued)

(52) U.S. Cl.
CPC ..... *H04W 72/0413* (2013.01); *H04L 27/2607* (2013.01); *H04W 72/042* (2013.01); *H04W 74/0833* (2013.01)

(58) Field of Classification Search
CPC ........... H04W 72/0413; H04W 72/042; H04W 72/0446; H04W 72/1284
See application file for complete search history.

(56) References Cited

U.S. PATENT DOCUMENTS 10,383,147 B2 * 8/2019 Rajagopal ......... H04W 74/0816
2009/0279493 A1 11/2009 Gaal et al.
(Continued)

FOREIGN PATENT DOCUMENTS

CN 101778419 A 7/2010
CN 105340348 A 2/2016
(Continued)

OTHER PUBLICATIONS

First Office Action and Search Report from CN app. No. 201711146913.4, dated Dec. 24, 2019, with English translation from Global Dossier.
(Continued)

Primary Examiner — Bo Hui A Zhu
(74) Attorney, Agent, or Firm — Ladas & Parry, LLP

(57) ABSTRACT

A physical uplink control channel transmission method, a terminal, and a network-side device are provided. The method includes: determining a target cyclic shift parameter corresponding to each symbol according to an initial cyclic shift parameter and a random value associated with at least an index of the symbol; sending a physical uplink control channel according to the target cyclic shift parameter.

8 Claims, 4 Drawing Sheets

Determining a target CS parameter corresponding to each symbol according to an initial CS parameter and a random value associated with at least an index of the symbol — 201

Sending a PUCCH according to the target CS parameter — 202

(51) Int. Cl.
*H04L 27/26* (2006.01)
*H04W 74/08* (2009.01)

(56) References Cited

U.S. PATENT DOCUMENTS

2014/0301251 A1  10/2014  Chen et al.
2018/0083751 A1*  3/2018  Seo .................. H04L 5/0048
2019/0007175 A1  1/2019  Kwak et al.

FOREIGN PATENT DOCUMENTS

| CN | 106160988 A | 11/2016 |
| EP | 3389208 A1 | 9/2016 |
| KR | 20100134071 A | 12/2010 |
| WO | 2014178764 A1 | 11/2014 |
| WO | 2016163738 A1 | 10/2016 |
| WO | 2017007937 A1 | 1/2017 |
| WO | 2017087022 A1 | 5/2017 |
| WO | 2017099521 A1 | 6/2017 |

OTHER PUBLICATIONS

First Office Action from TW app. No. 107137336, dated Jul. 16, 2020, with machine English translation.
3rd Generation Partnership Project; Technical Specification Group Radio Access Network; Evolved Universal Terrestrial Radio Access (E-UTRA); Physical channels and modulation (Release 13), 3GPP TS 36.211, V13.7.1 (Sep. 2017).
International Search Report from PCT/CN2018/107560, dated Dec. 14, 2018, with English translation from WIPO.
Written Opinion of the International Searching Authority from PCT/CN2018/107560, dated Dec. 14, 2018, with English translation from WIPO.
International Preliminary Report on Patentability from PCT/CN2018/107560, dated May 19, 2020, with English translation from WIPO.
Extended European Search Report from EP app. No. 18878117.3, dated Dec. 14, 2020.
"Channelization of 1-symbol short PUCCH with 1 or 2 bits payload", R1-1718559, 3GPP TSG RAN WG1 Meeting #90b, Prague, CZ, Oct. 9-13, 2017.
"$3^{rd}$ Generation Partnership Project; Technical Specification Group Radio Access Network; Evolved Universal Terrestrial Radio Access (E-UTRA); Physical channels and modulation (Release 12)", 3GPP TS 36.211 V12.9.0 (Mar. 2017).
Notice of Reasons for Refusal from JP app. No. 2020-526954, dated Aug. 24, 2021, with English translation provided by Global Dossier, all pages.
Notification of Reason for Refusal from KR app. No. 10-2020-7017284, dated Aug. 20, 2021, with English translation provided by Global Dossier, all pages.
3GPP TS36.211 v14.3.0, E-UTRA: Physical channels and modulation (Release 14), Jun. 2017, all pages.

* cited by examiner

PUCCH TRANSMISSION METHOD, TERMINAL AND NETWORK-SIDE DEVICE

CROSS-REFERENCE TO RELATED APPLICATIONS

This application is the U.S. national phase of PCT Application PCT/CN2018/107560 filed on Sep. 26, 2018, which claims a priority to Chinese Patent Application No. 201711146913.4 filed in China on Nov. 17, 2017, the disclosures of which are incorporated herein by reference in their entireties.

TECHNICAL FIELD

The present disclosure relates to the field of communication technology, in particular, relates to a Physical Uplink Control Channel (PUCCH) transmission method, a terminal and a network-side device.

BACKGROUND

As a demand for mobile communication services changes, organizations such as the International Telecommunication Union (ITU) and the Third Generation Partnership Project (3GPP) are beginning to study New Radio Access Technologies (New RAT (NR)), such as a Fifth Generation New RAT (5G NR). The New RAT defines a Physical Uplink Control Channel (PUCCH) that can occupy 4 to 14 symbols for transmission. The PUCCH may or may not use a frequency hopping structure in one slot. One format of the PUCCH in the NR (NR-PUCCH) may be used for carrying 1 or 2-bit information transmission. The format may enable to-be-transmitted information to be modulated by Binary Phase Shift Keying (BPSK) or Quadrature Phase Shift Keying (QPSK) so as to obtain a modulation symbol which is repeatedly transmitted on various symbols occupied by PUCCH transmission and carrying Uplink Control Information (UCI). The modulation symbol is carried in a Constant Amplitude Zero Auto Correlation (CAZAC) base sequence subject to a Cyclic Shift (CS) or a Computer-Generated (CG) base sequence on each symbol. Different symbols may also be spread by using a time-domain Orthogonal Cover Code (OCC), thereby supporting a larger multi-user multiplexing capacity. There is currently no method for obtaining CS values of NR-PUCCH having different lengths on each symbol. Therefore, it is necessary to provide a PUCCH transmission method for determining CS values of NR-PUCCH having different lengths on each symbol, so as to realize transmission of NR-PUCCH having different lengths.

SUMMARY

Embodiments of the present disclosure provide a PUCCH transmission method, a terminal, and a network-side device, so as to determine CS values of NR-PUCCH having different lengths on each symbol.

Some embodiments of the present disclosure provide a PUCCH transmission method applied to a terminal. The method includes determining a target cyclic shift (CS) parameter corresponding to each symbol according to an initial CS parameter and a random value associated with at least an index of a symbol; sending a PUCCH according to the target CS parameter.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a first formula, the first formula being $n_{cs}(n_s, l) = (CS_{init} + n_{cs}^{cell}(n_s, l)) \bmod N_{sc}^{RB}$; wherein $n_{cs}^{cell}(n_s, l) = \sum_{i=0}^{7} c(8 N_{symb}^{UL} \cdot n_s + 8l + i) \cdot 2^i$, $c(i)$ is a pseudo-random sequence initialized with a configured identifier (ID) or cell ID, $n_{cs}(n_s, l)$ is the target CS parameter corresponding to a symbol with an index l within a time unit with an index $n_s$, and $CS_{init}$ is the initial CS parameter, l is an index of a symbol within one or more time units, $n_s$ is an index of a time unit, $N_{sc}^{RB}$ is a quantity of is subcarriers included in a Resource Block (RB), and $N_{symb}^{UL}$ a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a second formula, the second formula being $n_{cs}(l) = (CS_{init} + n_{cs}^{cell}(l)) \bmod N_{sc}^{RB}$, wherein $n_{cs}^{cell}(l) = \sum_{i=0}^{7} c(8l+i) \cdot 2^i$, $c(i)$ is a pseudo-random sequence initialized with a configured identifier (ID) or cell ID, $n_{cs}(l)$ the target CS parameter corresponding to a symbol with an index l, $CS_{init}$ is the initial CS parameter, l is an index of a symbol within one or more time units, and $N_{sc}^{RB}$ is a quantity of subcarriers included in a Resource Block (RB).

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a third formula, the third formula being $$n_{cs}(n_s, l) = \left( \left\lfloor \frac{CS_{init}}{\Delta_{shift}} \right\rfloor \cdot \Delta_{shift} + n_{cs}^{cell}(n_s, l) \right) \bmod N_{sc}^{RB};$$

wherein $n_{cs}^{cell}(n_s, l) = \sum_{i=0}^{7} c(8 N_{symb}^{UL} \cdot n_s + 8l + i) \cdot 2^i$, $c(i)$ is a pseudo-random sequence initialized with a configured identifier (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers included in a Resource Block (RB), $\Delta_{shift}$ is a cyclic shift interval, and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a fourth formula, the fourth formula being $$n_{cs}(l) = \left( \left\lfloor \frac{CS_{init}}{\Delta_{shift}} \right\rfloor \cdot \Delta_{shift} + n_{cs}^{cell}(l) \right) \bmod N_{sc}^{RB};$$

wherein, $n_{cs}^{cell}(l) = \sum_{i=0}^{7} c(8l+i) \cdot 2^i$, $c(i)$ is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers included in a Resource Block (RB), and $\Delta_{shift}$ is a cyclic shift interval.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a fifth formula, the fifth formula being $n_{cs}(n_s, l)=((CS_{init}\cdot\Delta_{shift}) \bmod N_{sc}^{RB} + n_{cs}^{cell}(n_s, l)) \bmod N_{sc}^{RB}$; wherein $n_{cs}^{cell}(n_s, l)=\Sigma_{i=0}^{7} c(8N_{symb}^{UL}\cdot n_s+8l+i)\cdot 2^i$, $c(i)$ is a pseudo-random sequence initialized with a configured identifier (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers included in a Resource Block (RB), $\Delta_{shift}$ is a cyclic shift interval, and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a sixth formula, the sixth formula being $n_{cs}(l)=((CS_{init}\cdot\Delta_{shift}) \bmod N_{sc}^{RB} + n_{cs}^{cell}(l)) \bmod N_{sc}^{RB}$; wherein, $n_{cs}^{cell}(l)=\Sigma_{i=0}^{7} c(8l+i)\cdot 2^i$, $c(i)$ is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers included in a Resource Block (RB), and $\Delta_{shift}$ is a cyclic shift interval.

Optionally, the time unit includes one or more slots, or 14 symbols, or one or more subframes.

Optionally, the initial CS parameter is a CS parameter configured in advance by a network-side device to the terminal through a higher-layer signaling, or a CS parameter indicated by a network-side device through downlink control information (DCI), wherein the CS parameter indicated by the DCI is a CS parameter in one of a plurality of sets configured in advance to the terminal through a higher-layer signaling.

Some embodiments of the present disclosure further provide a physical uplink control channel (PUCCH) transmission method applied to a network-side device. The method includes determining a target cyclic shift (CS) parameter corresponding to each symbol according to an initial CS parameter and a random value associated with at least an index of a symbol; receiving, according to the target CS parameter, a PUCCH sent by a terminal.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a first formula, the first formula being $n_{cs}(n_s, l)=(CS_{init}+n_{cs}^{cell}(n_s, l)) \bmod N_{sc}^{RB}$; wherein $n_{cs}^{cell}(n_s, l)=\Sigma_{i=0}^{7} c(8N_{symb}^{UL}\cdot n_s+8l+i)\cdot 2^i$, $c(i)$ is a pseudo-random sequence initialized with a configured identifier (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers included in a Resource Block (RB), and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a second formula, the second formula being $n_{cs}(l)=(CS_{init}+n_{cs}^{cell}(l)) \bmod N_{sc}^{RB}$; wherein $n_{cs}^{cell}(l)=\Sigma_{i=0}^{7} c(8l+i)\cdot 2^i$, $c(i)$ is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, and $N_{sc}^{RB}$ a quantity of subcarriers included in a Resource Block (RB).

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a third formula, the third formula being $$n_{cs}(n_s, l) = \left(\left\lfloor \frac{CS_{init}}{\Delta_{shift}} \right\rfloor \cdot \Delta_{shift} + n_{cs}^{cell}(n_s, l)\right) \bmod N_{sc}^{RB};$$

wherein $n_{cs}^{cell}(n_s, l)=\Sigma_{i=0}^{7} c(8N_{symb}^{UL}\cdot n_s+8l+i)\cdot 2^i$, $c(i)$ is a pseudo-random sequence initialized with a configured identifier (ID) or cell ID, $n_{cs}(n_s, l)$ is the target CS parameter corresponding to a symbol with an index l within a time unit with an index $n_s$, $CS_{init}$ the initial CS parameter, l is an index of a symbol within one or more time units, $n_s$ is an index of a time unit, $N_{sc}^{RB}$ is a quantity of subcarriers included in a Resource Block (RB), $\Delta_{shift}$ is a cyclic shift interval, and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a fourth formula, the fourth formula being $$n_{cs}(l) = \left(\left\lfloor \frac{CS_{init}}{\Delta_{shift}} \right\rfloor \cdot \Delta_{shift} + n_{cs}^{cell}(l)\right) \bmod N_{sc}^{RB};$$

wherein, $n_{cs}^{cell}(l)=\Sigma_{i=0}^{7} c(8l+i)\cdot 2^i$, $c(i)$ is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers included in a Resource Block (RB), and $\Delta_{shift}$ is a cyclic shift interval.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a fifth formula, the fifth formula being $n_{cs}(n_s, l)=((CS_{init}\cdot\Delta_{shift}) \bmod N_{sc}^{RB}+n_{cs}^{cell}(n_s, l)) \bmod N_{sc}^{RB}$; wherein $n_{cs}^{cell}(n_s, l)=\Sigma_{i=0}^{7} c(8N_{symb}^{UL}\cdot n_s+8l+i)\cdot 2^i$, $c(i)$ is a pseudo-random sequence initialized with a configured identifier (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers included in a Resource Block (RB), $\Delta_{shift}$ is a cyclic shift interval, and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a sixth formula, the sixth formula being $n_{cs}(l)=((CS_{init}\cdot\Delta_{shift}) \bmod N_{sc}^{RB}+n_{cs}^{cell}(l)) \bmod N_{sc}^{RB}$; wherein, $n_{cs}^{cell}(l)=\Sigma_{i=0}^{7}c(8l+i)\cdot 2^i$, c(i) is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers included in a Resource Block (RB), and $\Delta_{shift}$ is a cyclic shift interval.

Optionally, the time unit includes one or more slots, or 14 symbols, or one or more subframes.

Optionally, the initial CS parameter is a CS parameter configured in advance by the network-side device to the terminal through a higher-layer signaling, or a CS parameter indicated by the network-side device through downlink control information (DCI), wherein the CS parameter indicated by the DCI is a CS parameter in one of a plurality of sets configured in advance to the terminal through a higher-layer signaling.

Some embodiments of the present disclosure further provide a terminal. The terminal includes a first calculating module, configured for determining a target cyclic shift (CS) parameter corresponding to each symbol according to an initial CS parameter and a random value associated with at least an index of a symbol; a sending module, configured for sending a physical uplink control channel (PUCCH) according to the target CS parameter.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a first formula, the first formula being $n_{cs}(n_s, l)=(CS_{init}+n_{cs}^{cell}(n_s, l)) \bmod N_{sc}^{RB}$; wherein $n_{cs}^{cell}(n_s, l)=\Sigma_{i=0}^{7}c(8N_{symb}^{UL}\cdot n_s+8l+i)\cdot 2^i$, c(i) is a pseudo-random sequence initialized with a configured identifier (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers included in a Resource Block (RB), and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a second formula, the second formula being $n_{cs}(l)=(CS_{init}+n_{cs}^{cell}(l)) \bmod N_{sc}^{RB}$, wherein $n_{cs}^{cell}(l)=\Sigma_{i=0}^{7}c(8l+i)\cdot 2^i$, c(i) is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, and $N_{sc}^{RB}$ is a quantity of subcarriers included in a Resource Block (RB).

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a third formula, the third formula being $$n_{cs}(n_s, l) = \left(\left\lfloor \frac{CS_{init}}{\Delta_{shift}} \right\rfloor \cdot \Delta_{shift} + n_{cs}^{cell}(n_s, l)\right) \bmod N_{sc}^{RB};$$

wherein $n_{cs}^{cell}(n_s, l)=\Sigma_{i=0}^{7}c(8N_{symb}^{UL}\cdot n_s+8l+i)\cdot 2^i$, c(i) is a pseudo-random sequence initialized with a configured identifier (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers included in a Resource Block (RB), $\Delta_{shift}$ is a cyclic shift interval, and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a fourth formula, the fourth formula being $$n_{cs}(l) = \left(\left\lfloor \frac{CS_{init}}{\Delta_{shift}} \right\rfloor \cdot \Delta_{shift} + n_{cs}^{cell}(l)\right) \bmod N_{sc}^{RB};$$

wherein, $n_{cs}^{cell}(l)=\Sigma_{i=0}^{7}c(8l+i)\cdot 2^i$, c(i) is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers included in a Resource Block (RB), and $\Delta_{shift}$ is a cyclic shift interval.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a fifth formula, the fifth formula being $n_{cs}(n_s, l)=((CS_{init}\cdot\Delta_{shift}) \bmod N_{sc}^{RB}+n_{cs}^{cell}(n_s, l)) \bmod N_{sc}^{RB}$; wherein $n_{cs}^{cell}(n_s, l)=\Sigma_{i=0}^{7}c(8N_{symb}^{UL}\cdot n_s+8l+i)\cdot 2^i$, c(i) is a pseudo-random sequence initialized with a configured identifier (ID) or cell ID, $n_{cs}(n_s, l)$ is a target CS parameter corresponding to a symbol with an index l within a time unit with an index $n_s$, $CS_{init}$ the initial CS parameter, l is an index of a symbol within one or more time units, $n_s$ is an index of a time unit, $N_{sc}^{RB}$ is a quantity of subcarriers included in a Resource Block (RB), $\Delta_{shift}$ is a cyclic shift interval, and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a sixth formula, the sixth formula being $n_{cs}(l)=((CS_{init}\cdot\Delta_{shift}) \bmod N_{sc}^{RB}+n_{cs}^{cell}(l)) \bmod N_{sc}^{RB}$; wherein, $n_{cs}^{cell}(l)=\Sigma_{i=0}^{7}c(8l+i)\cdot 2^i$, c(i) is a pseudo-random sequence initialized with a configured identifier (ID) or cell ID, $n_{cs}(l)$ is a target CS parameter corresponding to a symbol with an index l, $CS_{init}$ is the initial CS parameter, l is an index of a symbol within one or more time units, $N_{sc}^{RB}$ is a quantity of subcarriers included in a Resource Block (RB), and $\Delta_{shift}$ is a cyclic shift interval.

Some embodiments of the present disclosure further provide a network-side device. The network-side device includes: a second calculating module, configured for determining a target cyclic shift (CS) parameter corresponding to each symbol according to an initial CS parameter and a random value associated with at least an index of a symbol;

a receiving module, configured for receiving, according to the target CS parameter, a physical uplink control channel (PUCCH) sent by a terminal.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a first formula, the first formula being $n_{cs}(n_s, l)=(CS_{init}+n_{cs}^{cell}(n_s, l))\bmod N_{sc}^{RB}$; wherein $n_{cs}^{cell}(n_s, l)\Sigma_{i=0}^{7}c(8N_{symb}^{UL}\cdot n_s+8l+i)\cdot 2^i$, $c(i)$ is a pseudo-random sequence initialized with a configured identifier (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers included in a Resource Block (RB), and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a second formula, the second formula being $n_{cs}(l)=(CS_{init}+n_{cs}^{cell}(l))\bmod N_{sc}^{RB}$; wherein $n_{cs}^{cell}(l)=\Sigma_{i=0}^{7}c(8l+i)\cdot 2^i$, $c(i)$ is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, and $N_{sc}^{RB}$ a quantity of subcarriers included in a Resource Block (RB).

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a third formula, the third formula being $$n_{cs}(n_s, l) = \left(\left\lfloor \frac{CS_{init}}{\Delta_{shift}} \right\rfloor \cdot \Delta_{shift} + n_{cs}^{cell}(n_s, l)\right) \bmod N_{sc}^{RB};$$

wherein $n_{cs}^{cell}(n_s, l)\Sigma_{i=0}^{7}c(8N_{symb}^{UL}\cdot n_s+8l+i)\cdot 2^i$, $c(i)$ is a pseudo-random sequence initialized with a configured identifier (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers included in a Resource Block (RB), $\Delta_{shift}$ is a cyclic shift interval, and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a fourth formula, the fourth formula being $$n_{cs}(l) = \left(\left\lfloor \frac{CS_{init}}{\Delta_{shift}} \right\rfloor \cdot \Delta_{shift} + n_{cs}^{cell}(l)\right) \bmod N_{sc}^{RB};$$

wherein, $n_{cs}^{cell}(l)=\Sigma_{i=0}^{7}(8l+i)\cdot 2^i$, $c(i)$ is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers included in a Resource Block (RB), and $\Delta_{shift}$ is a cyclic shift interval.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a fifth formula, the fifth formula being $n_{cs}(n_s, l)=((CS_{init}\cdot\Delta_{shift})\bmod N_{sc}^{RB}+n_{cs}^{cell}(n_s, l))\bmod N_{sc}^{RB}$; wherein $n_{cs}^{cell}(n_s, l)\Sigma_{i=0}^{7}c(8N_{symb}^{UL}\cdot n_s+8l+i)\cdot 2^i$, $c(i)$ is a pseudo-random sequence initialized with a configured identifier (ID) or cell ID, $n_{cs}(n_s, l)$ is the target CS parameter corresponding to a symbol with an index l within a time unit with an index $n_s$, $C_{init}$ is the initial CS parameter, l is an index of a symbol within one or more time units, $n_s$ is an index of a time unit, $N_{sc}^{RB}$ is a quantity of subcarriers included in a Resource Block (RB), $\Delta_{shift}$ is a cyclic shift interval, and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a sixth formula, the sixth formula being $n_{cs}(l)=((CS_{init}\cdot\Delta_{shift})\bmod N_{sc}^{RB}+n_{cs}^{cell}(l))\bmod N_{sc}^{RB}$; wherein, $n_{cs}^{cell}(l)=\Sigma_{i=0}^{7}(8l+i)\cdot 2^i$, $c(i)$ is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers included in a Resource Block (RB), and $\Delta_{shift}$ is a cyclic shift interval.

Some embodiments of the present disclosure further provide a terminal. The terminal includes a transceiver, a storage, a processor, and a program stored on the storage and executable by the processor, wherein, the processor is configured to read the program on the storage and perform a following process: determining a target cyclic shift (CS) parameter corresponding to each symbol according to an initial CS parameter and a random value associated with at least an index of a symbol, the transceiver is configured for sending a physical uplink control channel (PUCCH) according to the target CS parameter; or, the transceiver is configured for determining a target cyclic shift (CS) parameter corresponding to each symbol according to an initial CS parameter and a random value associated with at least an index of a symbol, and sending a PUCCH according to the target CS parameter.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a first formula, the first formula being $n_{cs}(n_s, l)=(CS_{init}+n_{cs}^{cell}(n_s, l))\bmod N_{sc}^{RB}$; wherein $n_{cs}^{cell}(n_s, l)\Sigma_{i=0}^{7}c(8N_{symb}^{UL}\cdot n_s+8l+i)\cdot 2^i$, $c(i)$ is a pseudo-random sequence initialized with a configured identifier (ID) or cell ID, $n_{cs}(n_s, l)$ is the target CS parameter corresponding to a symbol with an index l within a time unit with an index $n_s$, and $CS_{init}$ is the initial CS parameter, l is an index of a symbol within one or more time units, $n_s$ is an index of a time unit, $N_{sc}^{RB}$ is a quantity of subcarriers included in a Resource Block (RB), and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a second formula, the second formula being $n_{cs}(l)=(CS_{init}+n_{cs}^{cell}(l))$ mod $N_{sc}^{RB}$, wherein $n_{cs}^{cell}(l)=\Sigma_{i=0}^{7}c(8l+i)\cdot 2^{i}$, c(i) is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, and $N_{sc}^{RB}$ is a quantity of subcarriers included in a Resource Block (RB).

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a third formula, the third formula being $$n_{cs}(n_s, l) = \left(\left\lfloor \frac{CS_{init}}{\Delta_{shift}} \right\rfloor \cdot \Delta_{shift} + n_{cs}^{cell}(n_s, l)\right) \bmod N_{sc}^{RB};$$

wherein $n_{cs}^{cell}(n_s, l)\Sigma_{i=0}^{7}c(8N_{symb}^{UL}\cdot n_s+8l+i)\cdot 2^{i}$, c(i) is a pseudo-random sequence initialized with a configured identifier (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers included in a Resource Block (RB), $\Delta_{shift}$ is a cyclic shift interval, and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a fourth formula, the fourth formula being $$n_{cs}(l) = \left(\left\lfloor \frac{CS_{init}}{\Delta_{shift}} \right\rfloor \cdot \Delta_{shift} + n_{cs}^{cell}(l)\right) \bmod N_{sc}^{RB};$$

wherein, $n_{cs}^{cell}(l)=\Sigma_{i=0}^{7}c(8l+i)\cdot 2^{i}$, c(i) is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers included in a Resource Block (RB), and $\Delta_{shift}$ is a cyclic shift interval.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a fifth formula, the fifth formula being $n_{cs}(n_s, l)=((CS_{init}\cdot\Delta_{shift})\bmod N_{sc}^{RB}+n_{sc}^{cell}(n_s, l))\bmod N_{sc}^{RB}$; wherein $n_{cs}^{cell}(n_s, l)\Sigma_{i=0}^{7}c(8N_{symb}^{UL}\cdot n_s+8l+i)\cdot 2^{i}$, c(i) is a pseudo-random sequence initialized with a configured identifier (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers included in a Resource Block (RB), $\Delta_{shift}$ is a cyclic shift interval, and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a second formula, the second formula being $n_{sc}(l)=(CS_{init}+n_{cs}^{cell}(l))$ mod $N_{sc}^{RB}$; wherein $n_{cs}^{cell}(l)=\Sigma_{i=0}^{7}c(8l+i)\cdot 2^{i}$, c(i) is a pseudo-random sequence initialized with a configured identifier (ID) or cell ID, $n_{cs}(l)$ is the target CS parameter corresponding to a symbol with an index l, $CS_{init}$ is the initial Optionally, determining the target CS parameter corresponding to each symbol according to the initial CS parameter and the random value associated with at least the index of the symbol includes: determining the target CS parameter $n_{cs}(l)$ corresponding to each symbol according to a sixth formula, the sixth formula being $n_{cs}(l)=((CS_{init}\cdot\Delta_{shift})\bmod N_{sc}^{RB}+n_{cs}^{cell}(l))\bmod N_{sc}^{RB}$; wherein, $n_{cs}^{cell}(l)=\Sigma_{i=0}^{7}c(8l+i)\cdot 2^{i}$, c(i) is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers included in a Resource Block (RB), and $\Delta_{shift}$ is a cyclic shift interval.

Optionally, the time unit includes one or more slots, or 14 symbols, or one or more subframes.

Optionally, the initial CS parameter is a CS parameter configured in advance by a network-side device to the terminal through a higher-layer signaling, or a CS parameter indicated by a network-side device through downlink control information (DCI), wherein the CS parameter indicated by the DCI is a CS parameter in one of a plurality of sets configured in advance to the terminal through a higher-layer signaling.

Some embodiments of the present disclosure further provide a network-side device. The network-side device includes a transceiver, a storage, a processor, and a program stored on the storage and executable by the processor, wherein, the processor is configured to read the program on the storage and perform a following process: determining a target cyclic shift (CS) parameter corresponding to each symbol according to an initial CS parameter and a random value associated with at least an index of a symbol, the transceiver is configured for receiving, according to the target CS parameter, a physical uplink control channel (PUCCH) sent by a terminal; or, the transceiver is configured for determining a target cyclic shift (CS) parameter corresponding to each symbol according to an initial CS parameter and a random value associated with at least an index of a symbol, and receiving, according to the target CS parameter, a PUCCH sent by a terminal.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a first formula, the first formula being $n_{sc}(n_s, l)=(CS_{init}+n_{cs}^{cell}(n_s, l))\bmod N_{sc}^{RB}$; wherein $n_{cs}^{cell}(n_s, l)\Sigma_{i=0}^{7}c(8N_{symb}^{UL}\cdot n_s+8l+i)\cdot 2^{i}$, c(i) is a pseudo-random sequence initialized with a configured identifier (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers included in a Resource Block (RB), and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a second formula, the second formula being $n_{sc}(l)=(CS_{init}+n_{cs}^{cell}(l))$ mod $N_{sc}^{RB}$; wherein $n_{cs}^{cell}(l)=\Sigma_{i=0}^{7}c(8l+i)\cdot 2^{i}$, c(i) is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, and $N_{sc}^{RB}$ a quantity of subcarriers included in a Resource Block (RB).

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a third formula, the third formula being $$n_{cs}(n_s, l) = \left(\left\lfloor \frac{CS_{init}}{\Delta_{shift}} \right\rfloor \cdot \Delta_{shift} + n_{cs}^{cell}(n_s, l)\right) \bmod N_{sc}^{RB};$$

wherein $n_{cs}^{cell}(n_s, l) = \Sigma_{i=0}^{7} c(8N_{symb}^{UL} \cdot n_s + 8l + i) \cdot 2^i$, c(i) is a pseudo-random sequence initialized with a configured identifier (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers included in a Resource Block (RB), $\Delta_{shift}$ is a cyclic shift interval, and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a fourth formula, the fourth formula being $$n_{cs}(l) = \left(\left\lfloor \frac{CS_{init}}{\Delta_{shift}} \right\rfloor \cdot \Delta_{shift} + n_{cs}^{cell}(l)\right) \bmod N_{sc}^{RB};$$

wherein, $n_{cs}^{cell}(l) = \Sigma_{i=0}^{7} c(8l+i) \cdot 2^i$, c(i) is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers included in a Resource Block (RB), and $\Delta_{shift}$ is a cyclic shift interval.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a fifth formula, the fifth formula being $n_{cs}(n_s, l) = ((CS_{init} \cdot \Delta_{shift}) \bmod N_{sc}^{RB} + n_{cs}^{cell}(n_s, l)) \bmod N_{sc}^{RB}$; wherein $n_{cs}^{cell}(n_s, l) = \Sigma_{i=0}^{7} c(8N_{symb}^{UL} \cdot n_s + 8l + i) \cdot 2^i$, c(i) is a pseudo-random sequence initialized with a configured identifier (ID) or cell ID, $n_{cs}(n_s, l)$ is the target CS parameter corresponding to a symbol with an index l within a time unit with an index $n_s$, $CS^{init}$ is the initial CS parameter, l is an index of a symbol within one or more time units, $n_s$ is an index of a time unit, $N_{sc}^{RB}$ is a quantity of subcarriers included in a Resource Block (RB), $\Delta_{shift}$ is a cyclic shift interval, and $N_{symb}^{UL}$ is a quantity of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a sixth formula, the sixth formula being $n_{cs}(l) = ((CS_{init} \cdot \Delta_{shift}) \bmod N_{sc}^{RB} + n_{cs}^{cell}(l)) \bmod N_{sc}^{RB}$; wherein, $n_{cs}^{cell}(l) = \Sigma_{i=0}^{7} c(8l+i) \cdot 2^i$, c(i) is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers included in a Resource Block (RB), and $\Delta_{shift}$ is a cyclic shift interval.

Optionally, the time unit includes one or more slots, or 14 symbols, or one or more subframes.

Optionally, the initial CS parameter is a CS parameter configured in advance by the network-side device to the terminal through a higher-layer signaling, or a CS parameter indicated by the network-side device through downlink control information (DCI), wherein the CS parameter indicated by the DCI is a CS parameter in one of a plurality of sets configured in advance to the terminal through a higher-layer signaling.

Thus, in some embodiments of the present disclosure, a target CS parameter corresponding to each symbol is determined based on an initial CS parameter and a random value associated with at least the index of the symbol, and a PUCCH is sent according to the target CS parameter. Since the embodiments of the present disclosure add, based on the initial CS parameter, a random value associated with at least an index of each symbol in calculation, it is possible to obtain that the target CS parameters corresponding to different symbols are different. In turn, CS values of the NR PUCCHs having different lengths on each symbol are determined. Hence, in the embodiment of that present disclosure, it can be ensured that the CS values on different symbols are different to a maximum extent, so as to achieve interference randomization, improve transmission performance of PUCCH, and ensure that the CS values of the NR-PUCCHs having different lengths on a same symbol are acquired in the same manner to support multiplexing transmission of the NR-PUCCHs having different lengths in the same Resource Block (RB) and reduce a PUCCH resource overhead of a system.

BRIEF DESCRIPTION OF THE DRAWINGS

In order to more clearly illustrate technical solutions of embodiments of the present disclosure, accompany drawings to be used in description of some embodiments of the present disclosure will be briefly described below. It will be apparent that the drawings in the following description are merely some embodiments of the present disclosure, and those of ordinary skill in the art may also obtain other drawings from these drawings without paying creative labor.

DETAILED DESCRIPTION

Figure 1:
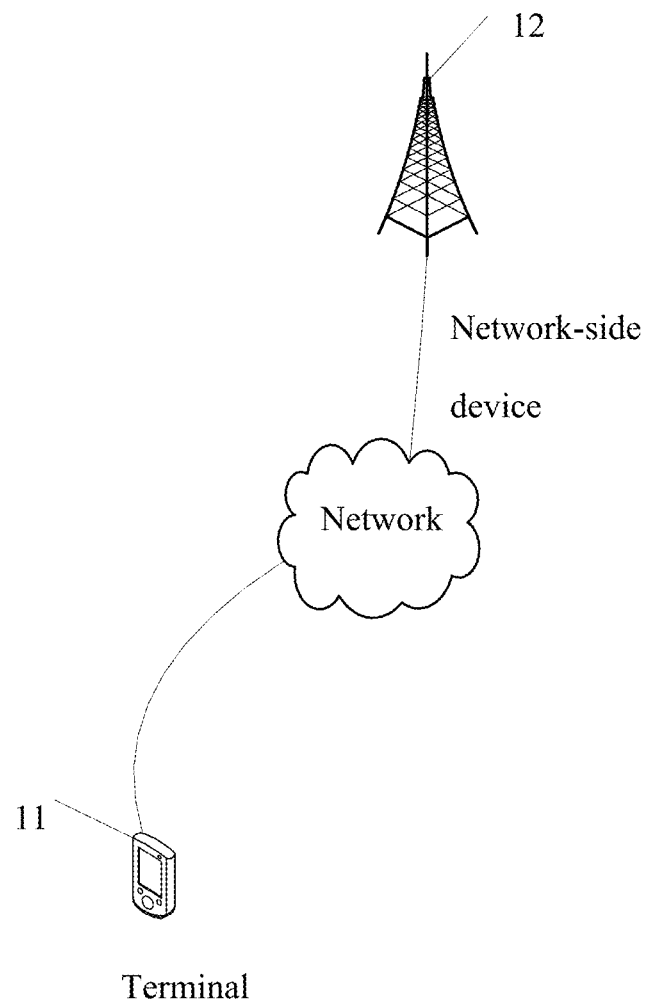
FIG. 1 is a schematic diagram of a network structure to which embodiments of the present disclosure are applicable.

The technical solutions in the embodiments of the present disclosure will be clearly and completely described below in conjunction with the accompanying drawings in the embodiments of the present disclosure. It is apparent that the described embodiments are a part, rather than all, of the embodiments of the present disclosure. Based on the embodiments of the present disclosure, all other embodiments obtained by those of ordinary skill in the art without paying creative labor are within the protection scope of the present disclosure.

As the demand for mobile communication services changes, organizations such as the ITU and the 3GPP have begun to study new wireless communication systems (such as the 5G NR). A new frame structure is defined in the new wireless communication system to support different baseband parameters (Numerology, including parameters such as a subcarrier spacing). A length of a subframe is consistent, i.e., 1 ms, among different baseband parameters; one subframe contains A slots corresponding to the different baseband parameters, the number of A may be different, so that the length of one subframe is 1 ms. A slot may contain 7 or 14 symbols (Orthogonal Frequency Division Multiplexing (OFDM) symbols, Discrete-Fourier-Transform Spread Orthogonal Frequency Division Multiplexing (DFT-S-OFDM) symbols or Pattern Division Multiple Access (PDMA) symbols) for different baseband parameters. A slot may have multiple slot structures/formats. Different slot structures/formats correspond to different uplink and downlink resource configurations. For example, all symbols in a slot may be used for downlink transmission, i.e., a DL only slot, or may be used for uplink transmission, i.e., an UL only slot; or one part of the all symbols may be used for uplink transmission, and one part of the all symbols may be used for downlink transmission, i.e., a DL+UL slot. The slot structure/format may be notified to a terminal via a Radio Resource Control (RRC) signaling in a semi-static manner, or be dynamically notified to the terminal via a Group Common PDCCH, so as to enable a slot structure to be dynamically changed.

Since the number of uplink symbols included in a slot may vary, two types of NR-PUCCH, i.e., a long NR-PUCCH and a short NR-PUCCH, are defined in a 5G NR system. The long NR-PUCCH may occupy 4 to 14 transmission symbols in a slot, the UCI and a Reference Signal (RS) are transmitted in a Time Division Multiplexing (TDM) manner, i.e., the UCI and the RS are transmitted by occupying different symbols, respectively. In order to improve uplink transmission performance, a frequency hopping structure may be used among a plurality of symbols occupied by the long NR-PUCCH, so as to obtain a frequency-domain diversity gain, and of course, a frequency hopping structure may not be used to improve a multi-user multiplexing capacity. One format of the NR-PUCCH may be used for carrying 1 or 2-bit information transmission The format may enable to-be-transmitted information to be modulated by Binary Phase Shift Keying (BPSK) or Quadrature Phase Shift Keying (QPSK) so as to obtain a modulation symbol which is repeatedly transmitted on various symbols occupied by PUCCH transmission and carrying Uplink Control Information (UCI). The modulation symbol is carried in a Constant Amplitude Zero Auto Correlation (CAZAC) base sequence subject to a Cyclic Shift (CS) or a Computer-Generated (CG) base sequence on each symbol. Different symbols may also be spread by using a time-domain Orthogonal Over Code (OCC), thereby supporting a larger multi-user multiplexing capacity. Based on the above, the embodiments of the present disclosure provide a PUCCH transmission method that can be used to determine CS values of PUCCHs having different lengths on each symbol, thereby realizing transmission of NR-PUCCHs having different lengths.

Referring to FIG. 1, FIG. 1 is a schematic diagram of a network structure to which some embodiments of the present disclosure are applicable. As shown in FIG. 1, the network structure includes a terminal (such as a User Equipment (UE)) 11 and a network-side device 12, wherein the terminal 11 may be a terminal-side device such as a mobile phone, a Tablet Personal Computer, a Laptop Computer, a Personal Digital Assistant (PDA), a Mobile Internet Device (MID), or a Wearable Device. It should be noted that, in some embodiments of the present disclosure, the terminal-side device is not limited to a specific type of the terminal 11. The network-side device 12 may be a base station, such as a macro station, a Long Term Evolution (LTE) Evolved Node B (eNB), a 5G NR NB, etc. The network-side device 12 may also be a micro station, such as a Low Power Node (LPN), a pico station, a femto station, etc., or the network-side device 12 may be an Access Point (AP). The base station may be a collection of network nodes including a Central Unit (CU) and a plurality of Transmission Reception Points (TRPs) which are managed and controlled by the Central Unit (CU). It should be noted that the network-side device 12 in some embodiments of the present disclosure is not limited to a specific type of network-side device.

Figure 2:
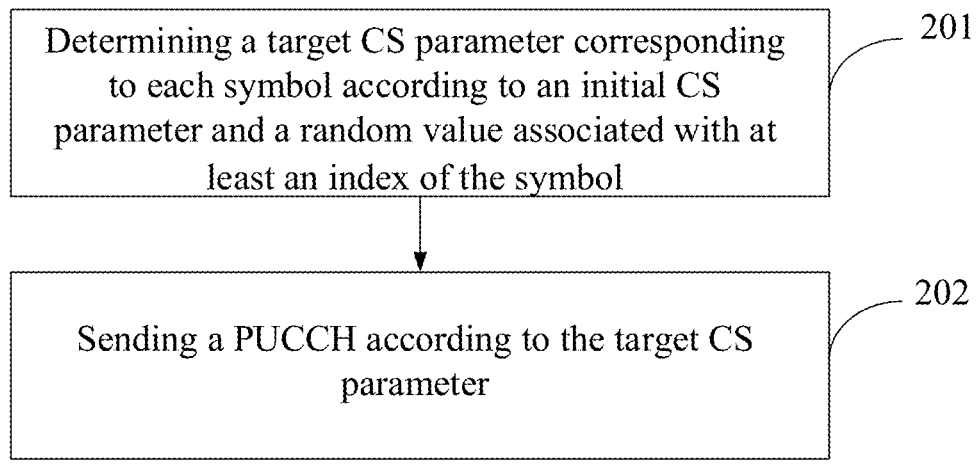
FIG. 2 is a flowchart of a PUCCH transmission method provided by some embodiments of the present disclosure.

Referring to FIG. 2, FIG. 2 is a flowchart of a PUCCH transmission method provided by some embodiments of the present disclosure. As shown in FIG. 2, the method includes following steps.

Step 201: determining a target CS parameter corresponding to each symbol according to an initial CS parameter and a random value associated with at least an index of a symbol.

The PUCCH transmission method provided by some embodiments of the present disclosure is mainly applied to a terminal and used for determining a CS parameter corresponding to each symbol occupied by a PUCCH.

In this step, each symbol is a symbol occupied by PUCCH transmission, and the symbol may be a symbol for access such as an OFDM symbol or a DFT-S-OFDM symbol. The initial CS parameter may be specified by a protocol in advance or configured by a network side, and a specific configuration manner of the initial CS parameter may be selected according to actual needs. For example, the initial CS parameter is a CS parameter configured in advance by a network-side device to the terminal through a higher-layer signaling, or a CS parameter indicated by a network-side device through a DCI, wherein the CS parameter indicated by the DCI is a CS parameter in one of a plurality of sets configured in advance to the terminal through a higher-layer signaling.

In the embodiment, the random value may include only a random value associated with the index of the symbol, or may include the random value associated with the index of the symbol as well as other random values. The target parameter with which the other random values need to be associated may be set according to actual needs, for example, in the embodiment, the target parameter may be numbered in a time unit. Specifically, a definition of the time unit may be defined according to actual needs, for example, in the embodiment, the time unit may be defined in the following three ways.

First way, the time unit includes one or more slots.
Second way, the time unit includes 14 symbols.
Third way, the time unit includes a sub-frame.

In this embodiment, the target CS parameter corresponding to each symbol can be determined based on the random value and the initial CS parameter configured at the network side.

Step 202: sending a PUCCH according to the target CS parameter.

In this step, after determining the target CS parameter corresponding to each symbol, a CS value corresponding to each symbol may be calculated based on the target CS parameter, so that a transmission sequence for the PUCCH is obtained according to the CS value, thereby performing transmission of the PUCCH.

Thus, in some embodiments of the present disclosure, a target CS parameter corresponding to each symbol is determined based on an initial CS parameter and a random value associated with at least the index of the symbol, and a PUCCH is sent according to the target CS parameter. Since the embodiments of the present disclosure add, based on the initial CS parameter, a random value associated with at least an index of each symbol in calculation, it is possible to obtain that the target CS parameters corresponding to different symbols are different. In turn, CS values of the NR PUCCHs having different lengths on each symbol are determined. Hence, in the embodiment of that present disclosure, it can be ensured that the CS values on different symbols are different to a maximum extent, so as to achieve interference randomization, improve transmission performance of PUCCH, and ensure that the CS values of the NR-PUCCHs having different lengths on a same symbol are acquired in the same manner to support multiplexing transmission of the NR-PUCCHs having different lengths in the same Resource Block (RB) and reduce a PUCCH resource overhead of a system.

Further, manners for determining the target CS parameter on each symbol are different for different configurations of random values, as will be described in detail in the following embodiments.

In a first implementation, determining a target CS parameter corresponding to each symbol according to an initial CS parameter and a random value associated with at least an index of a symbol includes: determining the target CS parameter $n_{cs}(n_s, l)$ corresponding to each symbol according to a first formula, the first formula being: $n_{cs}(n_s, l) = (CS_{init} + n_{cs}^{cell}(n_s, l)) \bmod N_{sc}^{RB}$; wherein $n_{cs}^{cell}(n_s, l) = \Sigma_{i=0}^{7} c(8N_{symb}^{UL} \cdot n_s + 8l + i) \cdot 2^i$, $c(i)$ is a pseudo-random sequence initialized with a configured ID or cell ID, $n_{cs}(n_s, l)$ is the target CS parameter corresponding to a symbol with an index l within a time unit with an index $n_s$ and $CS_{init}$ is the initial CS parameter. l is an index of a symbol within one or more time units, $n_s$ is an index of a time unit, $N_{sc}^{RB}$ is the number of subcarriers included in an RB, and $N_{symb}^{UL}$ is the number of symbols included in a slot.

In a second implementation, determining a target CS parameter corresponding to each symbol according to an initial CS parameter and a random value associated with at least an index of a symbol includes: determining the target CS parameter $n_{cs}(l)$ corresponding to each symbol according to a second formula, the second formula being $n_{cs}(l) = (CS_{init} + n_{cs}^{cell}(l)) \bmod N_{sc}^{RB}$, wherein $n_{cs}^{cell}(l) = \Sigma_{i=0}^{7} c(8l+i) \cdot 2^i$, wherein, $c(i)$ is the pseudo-random sequence initialized with a configured ID or cell ID, $n_{cs}(l)$ is the target CS parameter corresponding to a symbol with an index l, $C_{init}$ is the initial CS parameter, l is the index of the symbol within one or more time units, and $N_{sc}^{RB}$ is the number of subcarriers included in an RB.

In a third implementation, determining a target CS parameter corresponding to each symbol according to an initial CS parameter and a random value associated with at least an index of a symbol includes: determining the target CS parameter $n_{cs}(n_s, l)$ corresponding to each symbol according to a third formula, the third formula being $$n_{cs}(n_s, l) = \left(\left\lfloor \frac{CS_{init}}{\Delta_{shift}} \right\rfloor \cdot \Delta_{shift} + n_{cs}^{cell}(n_s, l)\right) \bmod N_{sc}^{RB};$$

wherein $n_{cs}^{cell}(n_s, l) \Sigma_{i=0}^{7} c(8N_{symb}^{UL} \cdot n_s + 8l + i) \cdot 2^i$, $c(i)$ is the pseudo-random sequence initialized with the configured ID or cell ID, $n_{cs}(n_s, l)$ the target CS parameter corresponding to a symbol with an index l within a time unit with an index $n_s$, $CS_{init}$ is the initial CS parameter. l is an index of a symbol within one or more time units, $n_s$ is an index of a time unit, $N_{sc}^{RB}$ is the number of subcarriers included in an RB, $\Delta_{shift}$ is a cyclic shift interval, and $N_{symb}^{UL}$ is the number of symbols included in a slot.

In a fourth implementation, determining a target CS parameter corresponding to each symbol according to an initial CS parameter and a random value associated with at least an index of a symbol includes: determining a target CS parameter $n_{cs}(l)$ corresponding to each symbol according to a fourth formula, the fourth formula being $$n_{cs}(l) = \left(\left\lfloor \frac{CS_{init}}{\Delta_{shift}} \right\rfloor \cdot \Delta_{shift} + n_{cs}^{cell}(l)\right) \bmod N_{sc}^{RB};$$

wherein, $n_{cs}^{cell}(l) = \Sigma_{i=0}^{7} c(8l+i) \cdot 2^i$, $c(i)$ is a pseudo-random sequence initialized with a configured ID or cell ID, $n_{cs}(l)$ is the target CS parameter corresponding to a symbol with an index l, $CS^{init}$ is the initial CS parameter, l is an index of a symbol within one or more time units, $N_{sc}^{RB}$ is the number of subcarriers included in an RB, and $\Delta_{shift}$ is a cyclic shift interval.

In a fifth implementation, determining a target CS parameter corresponding to each symbol according to an initial CS parameter and a random value associated with at least an index of a symbol includes: determining a target CS parameter $n_{cs}(n_s, l)$ corresponding to each symbol according to a fifth formula, the fifth formula being $n_{cs}(n_s, l) = ((CS_{init} \cdot \Delta_{shift}) \bmod N_{sc}^{RB} + n_{cs}^{cell}(n_s, l)) \bmod N_{sc}^{RB}$; wherein $n_{cs}^{cell}(n_s, l) \Sigma_{i=0}^{7} c(8N_{symb}^{UL} \cdot n_s + 8l + i) \cdot 2^i$, $c(i)$ is a pseudo-random sequence initialized with a configured ID or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is the number of subcarriers included in an RB, $\Delta_{shift}$ is a cyclic shift interval, and $N_{symb}^{UL}$ is the number of symbols included in a slot.

In a sixth implementation, determining a target CS parameter corresponding to each symbol according to an initial CS parameter and a random value associated with at least an index of a symbol includes: determining a target CS parameter $n_{cs}(l)$ corresponding to each symbol according to a sixth formula, the sixth formula being $n_{cs}(l) = ((CS_{init} \cdot \Delta_{shift}) \bmod N_{sc}^{RB} + n_{cs}^{cell}(l)) \bmod N_{sc}^{RB}$; wherein, $n_{cs}^{cell}(l) = \Sigma_{i=0}^{7} c(8l+i) \cdot 2^i$, $c(i)$ is a pseudo-random sequence initialized with a configured ID or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is the number of subcarriers included in an RB, and $\Delta_{shift}$ is a cyclic shift interval.

In an embodiment, l is the index of the symbol in a time unit, i.e., whether the NR-PUCCH occupies all or a part of symbols within the time unit, the index of the symbol is an index from the first symbol within the time unit instead of a number value starting with the first symbol occupied by the NR-PUCCH. This ensures that random values of all NR-PUCCHs on the same symbol within a time unit are the same, avoiding a case that due to starting positions of different NR-PUCCHs being different, there may be different random values for the same symbol position within a time unit since the same symbol position has different relative positions in the NR-PUCCHs when numbering according to symbols occupied by the NR-PUCCHs. If starting CSs of the NR-PUCCHs are different and the random values are also different, the same CS value may be obtained on the symbol, resulting in interference.

In an embodiment, $N_{sc}^{RB}$=12; $N_{sc}^{RB}$ may be used for the above formulas or $N_{sc}^{RB}$ may be directly replaced by 12.

Processes of implementing the above first to sixth implementations are described in detail below by way of two different embodiments.

Specifically, in an embodiment, the random value includes a random value associated with an index of a symbol and a random value associated with an index of a time unit. In such a case, the CS value corresponding to each symbol can be obtained by calculation according to $\alpha(n_s, l)=2\pi \cdot n_{cs}(n_s, l)/N_{sc}^{RB}$.

In this embodiment, it is assumed that the pseudo-random sequence c(i) is initialized with an ID=3, ns=0, a time unit is a slot containing 14 symbols, i.e. indexes of the 14 symbols are from 0 to 13, then the values on each symbol in the slot ns=0 may be obtained sequentially as [65, 106, 89, 191, 68, 73, 63, 48, 18, 84, 252, 230, 149, 236] according to $n_{cs}^{cell}(n_s, l)=\Sigma_{i=0}^{7} c(8N_{symb}^{UL} \cdot n_s+8l+i) \cdot 2^i$. It is assumed that a PUCCH occupies 7 symbols and is on symbols with indexes l=7 to 13, and $\Delta_{shift}$=2, then following are provided.

According to the above first implementation, it is assumed that $CS_{init}$ is configured according to $\Delta_{shift}$, that is, if $\Delta_{shift}$=2, then $CS_{init}$ can only be selected from [0, 2, 4, 6, 8, 10], or [1, 3, 5, 7, 9, 11]; for example, the base station configures through a signaling to UE1 a $CS_{init}$=1 and configures through a signaling to a UE2 a $CS_{init}$=3; CS parameters corresponding to symbols having indexes l from 0 to 13 are obtained as [6, 11, 6, 0, 9, 2, 4, 1, 7, 1, 1, 3, 6, 9], respectively, through calculation based on the $CS_{init}$ of UE1 according to $n_{cs}(n_s, l)=(CS_{init}+n_{cs}^{cell}(n_s, l))$mod $N_{sc}^{RB}$, and CS parameters corresponding to l=7 to 13 are selected or the CS parameters [1, 7, 1, 1, 3, 6, 9] corresponding to the symbols occupied by the PUCCH are directly obtained by calculation based on l=7 to 13, and based thereon, according to $\alpha_p(n_s, l)=2\pi \cdot n_{cs}^{(p)}(n_s, l)/N_{sc}^{RB}$, a CS value of each symbol occupied by the PUCCH of UE1 is obtained, UE1 obtains, based on the CS value, a transmission sequence on symbols occupied by the PUCCH transmitted by the UE1 and performs transmission. Similarly, CS parameters corresponding to symbols having indexes l from 0 to 13 are obtained as [8, 1, 8, 2, 11, 4, 6, 3, 9, 3, 3, 5, 6, 11], respectively, through calculation based on the $CS_{init}$ of UE2, and CS parameters corresponding to l=7 to 13 are selected or the CS parameters [3, 9, 3, 3, 5, 6, 11] corresponding to the symbols occupied by the PUCCH are directly obtained by calculation based on l=7 to 13, and based thereon, according to $\alpha_p(n_s, l)=2\pi \cdot n_{cs}^{(p)}(n_s, l)/N_{sc}^{RB}$, a CS value of each symbol occupied by the PUCCH of UE2 is obtained, UE2 obtains, based on the CS value, a transmission sequence on symbols occupied by the PUCCH transmitted by the UE2 and performs transmission.

According to the above third implementation, it is assumed that $CS_{init}$ is configured according to $\Delta_{shift}$, i.e., if $\Delta_{shift}$=2, then $CS_{init}$ can only be selected from a group [0, 2, 4, 6, 8, 10] or a group [1, 3, 5, 7, 9, 11]; if a parameter of one of the groups is selected for one UE, then another UE that needs to multiplex transmission in the same resource as that of the one UE needs to select a parameter in the same group as that of the one UE; for example, the base station configures a $CS_{init}$=1 to a UE1 through a signaling and configures $CS_{init}$=3 to a UE2 through a signaling; a CS parameter on each symbol is calculated based on $$n_{cs}(n_s, l) = \left( \left\lfloor \frac{CS_{init}}{\Delta_{shift}} \right\rfloor \cdot \Delta_{shift} + n_{cs}^{cell}(n_s, l) \right) \bmod N_{sc}^{RB},$$

this is equivalent to following processes: firstly normalizing the configured $CS_{init}$ as values of 0~12/$\Delta_{shift}$, i.e. 0 to 5 according to $\Delta_{shift}$, and then performing CS randomization based on the normalized CS parameters. That is, the CS parameters corresponding to symbols with indexes l from 0 to 13 are obtained as [5, 10, 5, 11, 8, 1, 3, 0, 6, 0, 0, 2, 5, 8] respectively, by calculation according to the $CS_{init}$ of UE1, CS parameters corresponding to l=7~13 are selected or the CS parameters [0, 6, 0, 0, 2, 5, 8] corresponding to the symbols occupied by PUCCH are directly obtained by calculation according to l=7~13; based thereon, the CS value of each symbol occupied by the PUCCH of UE1 is obtained based on $\alpha_p(n_s, l)=2\pi \cdot n_{cs}^{(p)}(n_s, l)/N_{sc}^{RB}$, UE1 obtains, based on the CS value, a transmission sequence on the symbol occupied by the PUCCH transmitted by the UE1, and performs transmission; similarly, the CS parameters corresponding to symbols with indexes l from 0 to 13 are obtained as [7, 0, 7, 1, 10, 3, 5, 2, 8, 2, 2, 4, 7, 10], respectively, by calculation according to $CS_{init}$ of UE2, the CS parameters corresponding to l=7~13 are selected or the CS parameters [2, 8, 2, 2, 4, 7, 10] corresponding to the symbols occupied by PUCCH are directly obtained by calculation according to l=7?13, and based thereon, the CS value of each symbol occupied by PUCCH of UE2 is obtained according to $\alpha_p(n_s, l)=2\pi \cdot n_{cs}^{(p)}(n_s, l)/N_{sc}^{RB}$, UE2 obtains, based on the CS value, the transmission sequence on the symbol occupied by the PUCCH transmitted by UE2, and performs transmission.

According to the above fifth implementation, it is assumed that the configured $CS_{init}$ is a value obtained after normalization is performed according to $\Delta_{shift}$, i.e., when $\Delta_{shift}$=1, $CS_{shift}$ configured by a gNB may be 0~11; when $\Delta_{shift}$=2, $CS_{init}$ configured by the gNB is 0~5. An advantage of such indication is that an indication range of $CS_{init}$ can be adjusted according to a size of $\Delta_{shift}$ thereby adjusting a required indication overhead, for example, a range of 0~11 requires 4 bits for indication, a range of 0~5 requires 3 bits for indication, and so on; in this case, whether a value from {0, 2, 4, 6, 8, 10} is selected or a value from {1, 3, 5, 7, 9, 11} is selected for use on a symbol according to a normalized $CS_{init}$, depends on whether $n_{cs}(n_s, l)$ is an even value or an odd value; for example, the base station configures to UE1 a $CS_{init}$=1 through a signaling and configures to UE2 a $CS_{init}$=3 through a signaling; then according to a formula $n_{cs}(n_s, l)=((CS_{init} \cdot \Delta_{shift})$mod $N_{sc}^{RB}+n_{cs}^{cell}(n_s, l))$mod $N_{sc}^{RB}$, the CS parameters corresponding to symbols with indexes l from 0 to 13 are obtained as [7, 0, 7, 1, 10, 3, 5, 2, 8, 2, 2, 4, 7, 10], respectively, by calculation according to $CS_{init}$ of UE1, the CS parameters corresponding to l=7~13 are selected or the CS parameters [2, 8, 2, 2, 4, 7, 10] corresponding to the symbols occupied by PUCCH are directly obtained by calculation according to l=7~13, and based thereon, the CS value of each symbol occupied by the PUCCH of UE1 is obtained according to $\alpha_{\tilde{p}}(n_s, l)=2\pi \cdot n_{cs}^{(\tilde{p})}(n_s, l)/N_{sc}^{RB}$, UE1 obtains, based on the CS value, the transmission sequence on the symbols occupied by the PUCCH transmitted by the UE1, and performs transmission. Similarly, the CS parameters corresponding to the symbols with indexes l from 0 to 13 are obtained as [11, 4, 11, 5, 2, 7, 9, 6, 0, 6, 6, 8, 11, 2], respectively, by calculation according to $CS_{init}$ of UE2, the CS parameters corresponding to l=7~13 are selected or the CS parameters [6, 0, 6, 6, 8, 11, 2] corresponding to the symbols occupied by PUCCH are directly obtained by calculation according to l=7~13; based thereon, the CS value of each symbol occupied by the PUCCH of UE2 is obtained according to $\alpha_{\tilde{p}}(n_s, l)=2\pi \cdot n_{cs}^{(\tilde{p})}(n_s, l)/N_{sc}^{RB}$, and UE2 obtains, based on the CS value, the transmission sequence on the symbols occupied by the PUCCH transmitted by UE2, and performs transmission.

In the embodiment, it may be implemented through the above implementations that although UE1 and UE2 transmit PUCCH on the same symbol, CS values on the same symbol are different, the base station may distinguish UE1 with UE2 according to different CS values on the same resource, randomize the CS values of the same UE in different symbols, and may achieve a purpose of resisting time-lasting interference. In addition, values $n_{cs}(n_s, l)$ on the same symbol among different cells are different, so that the CS values on the same symbol among different cells are different, and a purpose of interference randomization among different cells can be realized. Here, when either of ns and ID changes, the value $n_{cs}(n_s, l)$ obtained through calculation in the above embodiment also changes, so that the CS value on each symbol also changes.

In another embodiment, the random value includes only a random value associated with an index of a symbol. In such a case, the CS value corresponding to each symbol can be obtained by calculation according to $\alpha(l)=2\pi \cdot n_{cs}(l)/N_{sc}^{RB}$.

In this embodiment, it is assumed that the pseudo-random sequence is initialized with an ID=3, and a time unit is a slot containing 14 symbols, i.e., the 14 symbols having indexes l from 0 to 13, then values of $n_{cs}(l)$ on the symbols in a slot may be obtained as {65, 106, 89, 191, 68, 73, 63, 48, 18, 84, 252, 230, 149, 236} sequentially according to $n_{cs}^{cell}(l)=\Sigma_{i=0}^{7} c(8l+i) \cdot 2^i$. In the same cell, each slot corresponds to the same set of values of $n_{cs}(l)$, it is assumed that a PUCCH occupies 7 symbols with indexes l=7~13, and it is assumed that $\Delta_{shift}=2$, then following are provided According to the above second implementation, it is assumed that $CS_{init}$ is configured according to $\times_{shift}$, that is, if $\Delta_{shift}=2$, then $CS_{init}$ can only be selected from [0, 2, 4, 6, 8, 10], or [1, 3, 5, 7, 9, 11]; for example, the base station configures through a signaling to UE1 a $CS_{init}=1$ and configures through a signaling to a UE2 a $CS_{init}=3$; CS parameters corresponding to symbols with indexes l from 0 to 13 are obtained as [6, 11, 6, 0, 9, 2, 4, 1, 7, 1, 1, 3, 6, 9], respectively, through calculation based on the $CS_{init}$ of UE1 according to $n_{ns}(n_s, l)=(CS_{init}+n_{cs}^{cell}(n_s, l)) \mod N_{sc}^{RB}$, and CS parameters corresponding to l=7 to 13 are selected or the CS parameters [1, 7, 1, 1, 3, 6, 9] corresponding to the symbols occupied by the PUCCH are directly obtained based on l=7 to 13, and based thereon, according to $\alpha_{\tilde{p}}(l)=2\pi \cdot n_{cs}^{(\tilde{p})}(l)/N_{sc}^{RB}$, a CS value of each symbol occupied by the PUCCH of UE1 is obtained, UE1 obtains, based on the CS value, a transmission sequence on symbols occupied by the PUCCH transmitted by the UE1 and performs transmission. Similarly, CS parameters corresponding to symbols with indexes l from 0 to 13 are obtained as [8, 1, 8, 2, 11, 4, 6, 3, 9, 3, 3, 5, 6, 11], respectively, through calculation based on the $CS_{init}$ of UE2, and CS parameters corresponding to l=7 to 13 are selected or the CS parameters [3, 9, 3, 3, 5, 6, 11] corresponding to the symbols occupied by the PUCCH are directly obtained by calculation based on l=7 to 13, and based thereon, a CS value of each symbol occupied by the PUCCH of UE2 is obtained according to $\alpha_{\tilde{p}}(l)=2\pi \cdot n_{cs}^{(\tilde{p})}(l)/N_{sc}^{RB}$, UE2 obtains, based on the CS value, a transmission sequence on symbols occupied by the PUCCH transmitted by the UE2 and performs transmission.

According to the above fourth implementation, it is assumed that $CS_{init}$ s configured according to $\Delta_{shift}$, i.e., $\Delta_{shift}=2$, then $CS_{init}$ can only be selected from a group [1, 3, 5, 7, 9, 11] or a group [0, 2, 4, 6, 8, 10]; if a parameter of one of the groups is selected for one UE, then another UE that needs to multiplex transmission in the same resource as that of the one UE needs to select a parameter in the same group as that of the one UE; for example, the base station configures a $CS_{init}=1$ to a UE1 through a signaling and configures $CS_{init}=3$ to a UE2 through a signaling; a CS parameter on each symbol is calculated based on $$n_{cs}(l) = \left(\left\lfloor \frac{CS_{init}}{\Delta_{shift}} \right\rfloor \cdot \Delta_{shift} + n_{cs}^{cell}(l)\right) \bmod N_{sc}^{RB},$$

this is equivalent to following processes: firstly normalizing the configured $CS_{init}$ as values of $0\sim12/\Delta_{shift}$, i.e. 0 to 5 according to $\Delta_{shift}$ and then performing CS randomization based on the normalized CS parameters. That is, the CS parameters corresponding to symbols with indexes l from 0 to 13 are obtained as [5, 10, 5, 11, 8, 1, 3, 0, 6, 0, 0, 2, 5, 8] respectively, by calculation according to the $CS_{init}$ of UE1, CS parameters corresponding to l=7~13 are selected or the CS parameters [0, 6, 0, 0, 2, 5, 8] corresponding to the symbols occupied by PUCCH are directly obtained by calculation according to l=7~13; based thereon, the CS value of each symbol occupied by the PUCCH of UE1 is obtained based on $\alpha_{\tilde{p}}(l)=2\pi \cdot n_{cs}^{(\tilde{p})}(l)/N_{sc}^{RB}$, UE1 obtains, based on the CS value, a transmission sequence on the symbol occupied by the PUCCH transmitted by the UE1, and performs transmission. Similarly, the CS parameters corresponding to symbols with indexes l from 0 to 13 are obtained as [7, 0, 7, 1, 10, 3, 5, 2, 8, 2, 2, 4, 7, 10], respectively, by calculation according to $CS_{init}$ of UE2, the CS parameters corresponding to l=7~13 are selected or the CS parameters [2, 8, 2, 2, 4, 7, 10] corresponding to the symbols occupied by PUCCH are directly obtained by calculation according to l=7~13, and based thereon, the CS value of each symbol occupied by PUCCH of UE2 is obtained according to $\alpha_{\tilde{p}}(l)=2\pi \cdot n_{cs}^{(\tilde{p})}(l)/N_{sc}^{RB}$, UE2 obtains, based on the CS value, the transmission sequence on the symbol occupied by the PUCCH transmitted by UE2, and performs transmission.

According to the above sixth implementation, it is assumed that the configured $CS_{init}$ is a value obtained after normalization is performed according to $\Delta_{shift}$, i.e., when $\Delta_{shift}=1$, $CS_{init}$ configured by a base station may be 0~11; when $\Delta_{shift}=2$, $CS_{init}$ configured by the base station is 0~5. An advantage of such indication is that an indication range of $CS_{init}$ can be adjusted according to a size of $\Delta_{shift}$, thereby adjusting a required indication overhead, for example, a range of 0~11 requires 4 bits for indication, a range of 0~5 requires 3 bits for indication, and so on; in this case, whether a value from {0, 2, 4, 6, 8, 10} is selected or a value from {1, 3, 5, 7, 9, 11} is selected for use on a symbol according to a normalized $CS_{init}$, depends on whether $n_{cs}(n_s, l)$ is an even value or an odd value; for example, the base station configures to UE1 a $CS_{init}=1$ through a signaling and configures to UE2 a $CS_{init}=3$ through a signaling; then according to a formula $n_{cs}(l)=((CS_{init} \cdot \Delta_{shift}) \bmod N_{sc}^{RB} + n_{cs}^{cell}(l)) \bmod N_{sc}^{RB}$, the CS parameters corresponding to symbols with indexes l from 0 to 13 are obtained as [7, 0, 7, 1, 10, 3, 5, 2, 8, 2, 2, 4, 7, 10], respectively, by calculation according to $CS_{init}$ of UE1, the CS parameters corresponding to l=7~13 are selected or the CS parameters [2, 8, 2, 2, 4, 7, 10] corresponding to the symbols occupied by PUCCH are directly obtained by calculation according to l=7~13, and based thereon, the CS value of each symbol occupied by the PUCCH of UE1 is obtained according to $\alpha_{\tilde{p}}(l)=2\pi \cdot n_{cs}^{(\tilde{p})}(l)/N_{sc}^{RB}$, UE1 obtains, based on the CS value, the transmission sequence on the symbols occupied by the PUCCH transmitted by the UE1, and performs transmission. Similarly, the CS parameters corresponding to the symbols with indexes l from 0 to 13 are obtained as [11, 4, 11, 5, 2, 7, 9, 6, 0, 6, 6, 8, 11, 2], respectively, by calculation according to $CS_{init}$ of UE2, the CS parameters corresponding to l=7~13 are selected or the CS parameters [6, 0, 6, 6, 8, 11, 2] corresponding to the symbols occupied by PUCCH are directly obtained by calculation according to l=7~13; based thereon, the CS value of each symbol occupied by the PUCCH of UE2 is obtained according to $\alpha_{\tilde{p}}(l)=2\pi \cdot n_{cs}^{(\tilde{p})}(l)/N_{sc}^{RB}$, and UE2 obtains, based on the CS value, the transmission sequence on the symbols occupied by the PUCCH transmitted by UE2, and performs transmission.

In the embodiment, it may be implemented through the above implementations that although UE1 and UE2 transmit PUCCH on the same symbol, CS values on the same symbol are different, the base station may distinguish UE1 with UE2 according to different CS values on the same resource, randomize the CS values of the same UE in different symbols, and may achieve a purpose of resisting time-lasting interference. In addition, values $n_{cs}(n_s, l)$ on the same symbol among different cells are different, so that the CS values on the same symbol among different cells are different, and a purpose of interference randomization among different cells can be realized. Here, when an ID changes, the value $n_{cs}(n_s, l)$ obtained through calculation in the above embodiment also changes, so that the CS value on each symbol also changes.

Figure 3:
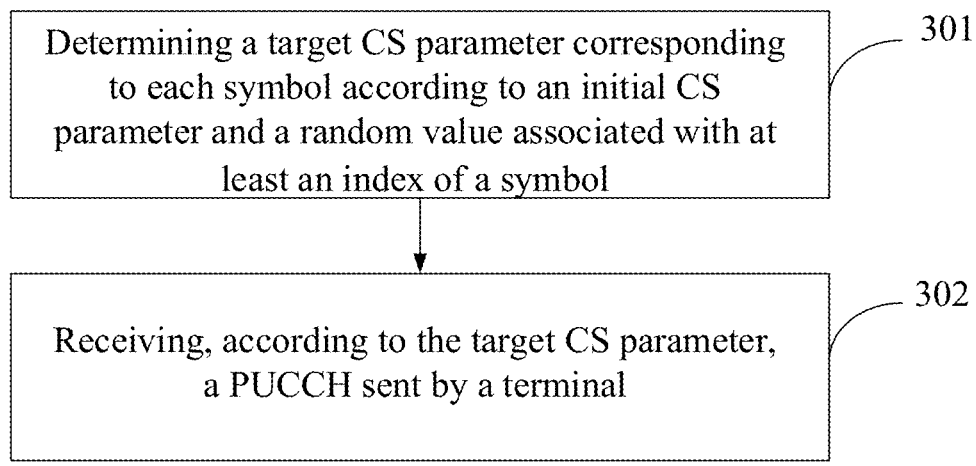
FIG. 3 is another flowchart of a PUCCH transmission method provided by some embodiments of the present disclosure.

Further, referring to FIG. 3, FIG. 3 also provides a flowchart of another embodiment of a PUCCH transmission method of the present disclosure. As shown in FIG. 3, the PUCCH transmission method includes steps 301-302.

Step 301: determining a target CS parameter corresponding to each symbol according to an initial CS parameter and a random value associated with at least an index of a symbol.

Step 302: receiving, according to the target CS parameter, a PUCCH sent by a terminal.

Optionally, the Step 301 includes: determining the target CS parameter $n_{cs}(n_s, l)$ corresponding to each symbol according to a first formula, the first formula being $n_{cs}(n_s, l)=(CS_{init}+n_{cs}^{cell}(n_s, l)) \bmod N_{sc}^{RB}$; wherein $n_{cs}^{cell}(n_s, l)=\sum_{i=0}^{7} c(8N_{symb}^{UL} \cdot n_s + 8l + i) \cdot 2^i$, $c(i)$ is a pseudo-random sequence initialized with a configured ID or cell ID, $n_{cs}(n_s, l)$ is the target CS parameter corresponding to a symbol with an index l within a time unit with an index $n_s$, and $CS_{init}$ is the initial CS parameter. l is an index of a symbol within one or more time units, $n_s$ is an index of a time unit, $N_{sc}^{RB}$ is the number of subcarriers included in an RB, and $N_{symb}^{UL}$ is the number of symbols included in a slot.

Optionally, the above Step 301 includes: determining the target CS parameter $n_{cs}(l)$ corresponding to each symbol according to a second formula, the second formula being $n_{cs}(l)=(CS_{init}+n_{cs}^{cell}(l)) \bmod N_{sc}^{RB}$, wherein $n_{cs}^{cell}(l)=\sum_{i=0}^{7} c(8l+i) \cdot 2^i$, $c(i)$ is the pseudo-random sequence initialized with a configured ID or cell ID, $n_{cs}(l)$ is the target CS parameter corresponding to a symbol with an index l, $CS_{init}$ is the initial CS parameter, l is the index of the symbol within one or more time units, and $N_{sc}^{RB}$ is the number of subcarriers included in an RB.

Optionally, determining a target CS parameter corresponding to each symbol according to an initial CS parameter and a random value associated with at least an index of a symbol includes: determining the target CS parameter $n_{cs}(n_s, l)$ corresponding to each symbol according to a third formula, the third formula being $$n_{cs}(n_s, l) = \left( \left\lfloor \frac{CS_{init}}{\Delta_{shift}} \right\rfloor \cdot \Delta_{shift} + n_{cs}^{cell}(n_s, l) \right) \bmod N_{sc}^{RB};$$

wherein $n_{cs}^{cell}(n_s, l)=\sum_{i=0}^{7} c(8N_{symb}^{UL} \cdot n_s + 8l + i) \cdot 2^i$, $c(i)$ is the pseudo-random sequence initialized with the configured ID or cell ID, $n_{cs}(n_s, l)$ is the target CS parameter corresponding to a symbol with an index l within a time unit with an index $n_s$, $CS_{init}$ is the initial CS parameter. l is an index of a symbol within one or more time units, $n_s$ is an index of a time unit, $N_{sc}^{RB}$ is the number of subcarriers included in an RB, $\Delta_{shift}$ is a cyclic shift interval, and $N_{symb}^{UL}$ is the number of symbols included in a slot.

Optionally, the above Step 301 includes: determining a target CS parameter $n_{cs}(l)$ corresponding to each symbol according to a fourth formula, the fourth formula being $$n_{cs}(l) = \left( \left\lfloor \frac{CS_{init}}{\Delta_{shift}} \right\rfloor \cdot \Delta_{shift} + n_{cs}^{cell}(l) \right) \bmod N_{sc}^{RB};$$

wherein, $n_{cs}^{cell}(l)=\sum_{i=0}^{7} c(8l+i) \cdot 2^i$, $c(i)$ is a pseudo-random sequence initialized with a configured ID or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is the number of subcarriers included in an RB, and $\Delta_{shift}$ is a cyclic shift interval.

Optionally, the above Step 301 includes: determining a target CS parameter $n_{cs}(n_s, l)$ corresponding to each symbol according to a fifth formula, the fifth formula being $n_{cs}(n_s, l)=((CS_{init} \cdot \Delta_{shift}) \bmod N_{sc}^{RB} n_{cs}^{cell}(n_s, l)) \bmod N_{sc}^{RB}$; wherein $n_{cs}^{cell}(n_s, l)=\sum_{i=0}^{7} c(8N_{symb}^{UL} \cdot n_s + 8l + i) \cdot 2^i$, $c(i)$ is a pseudo-random sequence initialized with a configured ID or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is the number of subcarriers included in an RB, $\Delta_{shift}$ is a cyclic shift interval, and $N_{symb}^{UL}$ is the number of symbols included in a slot.

Optionally, the above Step 301 includes: determining a target CS parameter $n_{cs}(l)$ corresponding to each symbol according to a sixth formula, the sixth formula being $n_{cs}(l)=((CS_{init} \cdot \Delta_{shift}) \bmod N_{sc}^{RB} + n_{cs}^{cell}(l)) \bmod N_{sc}^{RB}$; wherein, $n_{cs}^{cell}(l)=\sum_{i=0}^{7} c(8l+i) \cdot 2^i$, $c(i)$ is a pseudo-random sequence initialized with a configured ID or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is the number of subcarriers included in an RB, and $\Delta_{shift}$ is a cyclic shift interval.

Optionally, the time unit includes one or more slots, or 14 symbols, or one or more subframes.

Optionally, the initial CS parameter is a CS parameter configured in advance by a network-side device to the terminal through a higher-layer signaling, or a CS parameter indicated by a network-side device through a DCI, wherein the CS parameter indicated by the DCI is a CS parameter in one of a plurality of sets configured in advance to the terminal through a higher-layer signaling.

It should be noted that this embodiment is an embodiment of a network-side device corresponding to the embodiment shown in FIG. 2, specific implementation of this embodiment can be obtained by referring to related description of the embodiment shown in FIG. 2, and in order to avoid repeated description, this embodiment will not be described in detail, and the same beneficial effect can also be achieved.

Figure 4:
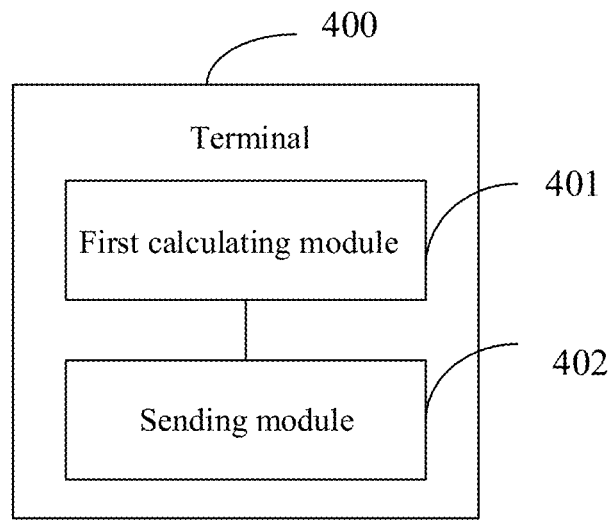
FIG. 4 is a structural diagram of a terminal provided by some embodiments of the present disclosure.

Referring to FIG. 4, FIG. 4 is a structure diagram of a terminal provided by some embodiments of the present disclosure. As shown in FIG. 4, the terminal 400 includes a first calculating module 401 and a sending module 402.

The first calculating module 401 is configured for determining a target CS parameter corresponding to each symbol according to an initial CS parameter and a random value associated with at least an index of a symbol. The sending module 402 is configured for sending a PUCCH according to the target CS parameter.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a first formula, the first formula being: $n_{cs}(n_s, l)=(CS_{init}+n_{cs}^{cell}(n_s, l)) \bmod N_{sc}^{RB}$; wherein $n_{cs}^{cell}(n_s, l)=\Sigma_{i=0}^{7} c(8N_{symb}^{UL} \cdot n_s+8l+i) \cdot 2^i$, c(i) is a pseudo-random sequence initialized with a configured ID or cell ID, $n_{cs}(n_s, l)$ is the target CS parameter corresponding to a symbol with an index l within a time unit with an index $n_s$, and $CS_{init}$ is the initial CS parameter. l is an index of a symbol within one or more time units, $n_s$ is an index of a time unit, $N_{sc}^{RB}$ is the number of subcarriers included in an RB, and $N_{symb}^{UL}$ is the number of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a second formula, the second formula being $n_{cs}(l)=(CS_{init}+n_{cs}^{cell}(l)) \bmod N_{sc}^{RB}$, wherein $n_{cs}^{cell}(l)=\Sigma_{i=0}^{7} c(8l+i) \cdot 2^i$, wherein, c(i) is the pseudo-random sequence initialized with a configured ID or cell ID, $n_{cs}(l)$ is the target CS parameter corresponding to a symbol with an index l, $CS_{init}$ is the initial CS parameter, l is the index of the symbol within one or more time units, and $N_{sc}^{RB}$ is the number of subcarriers included in an RB.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a third formula, the third formula being $$n_{cs}(n_s, l) = \left(\left\lfloor \frac{CS_{init}}{\Delta_{shift}} \right\rfloor \cdot \Delta_{shift} + n_{cs}^{cell}(n_s, l)\right) \bmod N_{sc}^{RB};$$

wherein $n_{cs}^{cell}(n_s, l)=\Sigma_{i=0}^{7} c(8N_{symb}^{UL} \cdot n_s+8l+i) \cdot 2^i$, c(i) is the pseudo-random sequence initialized with the configured ID or cell ID, $n_{cs}(n_s, l)$ is the target CS parameter corresponding to a symbol with an index l within a time unit with an index $n_s$, $CS_{init}$ is the initial CS parameter. l is an index of a symbol within one or more time units, $n_s$ is an index of a time unit, $N_{sc}^{RB}$ is the number of subcarriers included in an RB, $\Delta_{shift}$ is a cyclic shift interval, and $N_{symb}^{UL}$ is the number of symbols included in a slot.

Optionally, determining the target CS parameter corresponding to each symbol according to the initial CS parameter and the random value associated with at least the index of the symbol includes: determining a target CS parameter $n_{cs}(l)$ corresponding to each symbol according to a fourth formula, the fourth formula being $$n_{cs}(l) = \left(\left\lfloor \frac{CS_{init}}{\Delta_{shift}} \right\rfloor \cdot \Delta_{shift} + n_{cs}^{cell}(l)\right) \bmod N_{sc}^{RB};$$

wherein, $n_{cs}^{cell}(l)=\Sigma_{i=0}^{7} c(8l+i) \cdot 2^i$, c(i) is a pseudo-random sequence initialized with a configured ID or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is the number of subcarriers included in an RB, and $\Delta_{shift}$ is a cyclic shift interval.

Optionally, determining the target CS parameter corresponding to each symbol according to the initial CS parameter and the random value associated with at least the index of the symbol includes: determining a target CS parameter $n_{cs}(n_s, l)$ corresponding to each symbol according to a fifth formula, the fifth formula being $n_{cs}(n_s, l)=((CS_{init} \cdot \Delta_{shift}) \bmod N_{sc}^{RB} + n_{cs}^{cell}(n_s, l)) \bmod N_{sc}^{RB}$; wherein $n_{cs}^{cell}(n_s, l)=\Sigma_{i=0}^{7} c(8N_{symb}^{UL} \cdot n_s+8l+i) \cdot 2^i$, c(i) is a pseudo-random sequence initialized with a configured ID or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is the number of subcarriers included in an RB, $\Delta_{shift}$ is a cyclic shift interval, and $N_{symb}^{UL}$ is the number of symbols included in a slot.

Optionally, determining the target CS parameter corresponding to each symbol according to the initial CS parameter and the random value associated with at least the index of the symbol includes: determining a target CS parameter $n_{cs}(l)$ corresponding to each symbol according to a sixth formula, the sixth formula being $n_{cs}(l)=((CS_{init} \cdot \Delta_{shift}) \bmod N_{sc}^{RB} + n_{cs}^{cell}(l)) \bmod N_{sc}^{RB}$; wherein, $n_{cs}^{cell}(l)=\Sigma_{i=0}^{7} c(8l+i) \cdot 2^i$, c(i) is a pseudo-random sequence initialized with a configured ID or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is the number of subcarriers included in an RB, and $\Delta_{shift}$ is a cyclic shift interval.

It should be noted that the terminal 400 described above in this embodiment may be the terminal in any embodiment of the method embodiments in the present disclosure. Any embodiment of the terminal in the method embodiments of the present disclosure can be realized by the above-described terminal 400 in the embodiment, and the same beneficial effects are achieve, which will not be described here.

Figure 5:
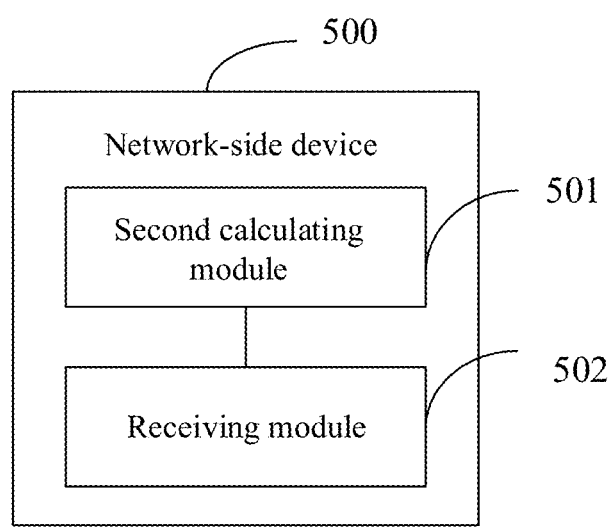
FIG. 5 is a structural diagram of a network-side device provided by some embodiments of the present disclosure.

Referring to FIG. 5, FIG. 5 is a structure diagram of a network-side device provided by some embodiments of the present disclosure. As shown in FIG. 5, the network-side device 500 includes a second calculating module 501 and a receiving module 502.

The second calculating module 501 is configured for determining a target CS parameter corresponding to each symbol according to an initial CS parameter and a random value associated with at least an index of a symbol. The receiving module 502 is configured for receiving, according to the target CS parameter, a PUCCH sent by a terminal.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a first formula, the first formula being $n_{cs}(n_s, l)=(CS_{init}+n_{cs}^{cell}(n_s, l)) \bmod N_{sc}^{RB}$; wherein $n_{cs}^{cell}(n_s, l)=\Sigma_{i=0}^{7} c(8 N_{symb}^{UL} \cdot n_s+8l+i) \cdot 2^i$, c(i) is a pseudo-random sequence initialized with a configured ID or cell ID, $n_{cs}(n_s, l)$ is the target CS parameter corresponding to a symbol with an index l within a time unit with an index $n_s$, and $CS_{init}$ is the initial CS parameter. l is an index of a symbol within one or more time units, $n_s$ is an index of a time unit, $N_{sc}^{RB}$ is the number of subcarriers included in an RB, and $N_{symb}^{UL}$ is the number of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a second formula, the second formula being $n_{cs}(l)=(CS_{init}+n_{cs}^{cell}(l)) \bmod N_{sc}^{RB}$, wherein $n_{cs}^{cell}(l)=\Sigma_{i=0}^{7} c(8l+i) \cdot 2^i$, c(i) is the pseudo-random sequence initialized with a configured ID or cell ID, $n_{cs}(l)$ is the target CS parameter corresponding to a symbol with an index l, $CS_{init}$ is the initial CS parameter, l is the index of the symbol within one or more time units, and $N_{sc}^{RB}$ is the number of subcarriers included in an RB.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a third formula, the third formula being $$n_{cs}(n_s, l) = \left( \left\lfloor \frac{CS_{init}}{\Delta_{shift}} \right\rfloor \cdot \Delta_{shift} + n_{cs}^{cell}(n_s, l) \right) \bmod N_{sc}^{RB};$$

wherein $n_{cs}^{cell}(n_s, l)=\Sigma_{i=0}^{7} c(8 N_{symb}^{UL} \cdot n_s+8l+i) \cdot 2^i$, c(i) is the pseudo-random sequence initialized with the configured ID or cell ID, $n_{cs}(n_s, l)$ is the target CS parameter corresponding to a symbol with an index l within a time unit with an index $n_s$, $CS_{init}$ is the initial CS parameter. l is an index of a symbol within one or more time units, $n_s$ is an index of a time unit, $N_{sc}^{RB}$ is the number of subcarriers included in an RB, $\Delta_{shift}$ is a cyclic shift interval, and $N_{symb}^{UL}$ is the number of symbols included in a slot.

Optionally, determining the target CS parameter corresponding to each symbol according to the initial CS parameter and the random value associated with at least the index of the symbol includes: determining a target CS parameter $n_{cs}(l)$ corresponding to each symbol according to a fourth formula, the fourth formula being $$n_{cs}(l) = \left( \left\lfloor \frac{CS_{init}}{\Delta_{shift}} \right\rfloor \cdot \Delta_{shift} + n_{cs}^{cell}(l) \right) \bmod N_{sc}^{RB};$$

wherein, $n_{cs}^{cell}(l)=\Sigma_{i=0}^{7} c(8l+i) \cdot 2^i$, c(i) is a pseudo-random sequence initialized with a configured ID or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is the number of subcarriers included in an RB, and $\Delta_{shift}$ is a cyclic shift interval.

Optionally, determining the target CS parameter corresponding to each symbol according to the initial CS parameter and the random value associated with at least the index of the symbol includes: determining a target CS parameter $n_{cs}(n_s, l)$ corresponding to each symbol according to a fifth formula, the fifth formula being $n_{cs}(n_s, l)=((CS_{init} \cdot \Delta_{shift}) \bmod N_{sc}^{RB}+n_{cs}^{cell}(n_s, l)) \bmod N_{sc}^{RB}$; wherein $n_{cs}^{cell}(n_s, l)=\Sigma_{i=0}^{7} c(8 N_{symb}^{UL} \cdot n_s+8l+i) \cdot 2^i$, c(i) is the pseudo-random sequence initialized with a configured ID or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is the number of subcarriers included in an RB, $\Delta_{shift}$ is a cyclic shift interval, and $N_{symb}^{UL}$ is the number of symbols included in a slot.

Optionally, determining the target CS parameter corresponding to each symbol according to the initial CS parameter and the random value associated with at least the index of the symbol includes: determining a target CS parameter $n_{cs}(l)$ corresponding to each symbol according to a sixth formula, the sixth formula being $n_{cs}(l)=((CS_{init} \cdot \Delta_{shift}) \bmod N_{sc}^{RB}+n_{cs}^{cell}(l)) \bmod N_{sc}^{RB}$; wherein, $n_{cs}^{cell}(l)=\Sigma_{i=0}^{7} c(8l+i) \cdot 2^i$, c(i) is a pseudo-random sequence initialized with a configured ID or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is the number of subcarriers included in an RB, and $\Delta_{shift}$ is a cyclic shift interval.

It should be noted that the network-side device 500 described above in this embodiment may be the network-side device in any embodiment of the method embodiments in the present disclosure. Any embodiment of the network-side device in the method embodiments of the present disclosure can be realized by the above-described network-side device 500 in the embodiment, and the same beneficial effects are achieve, which will not be described here.

Figure 6:
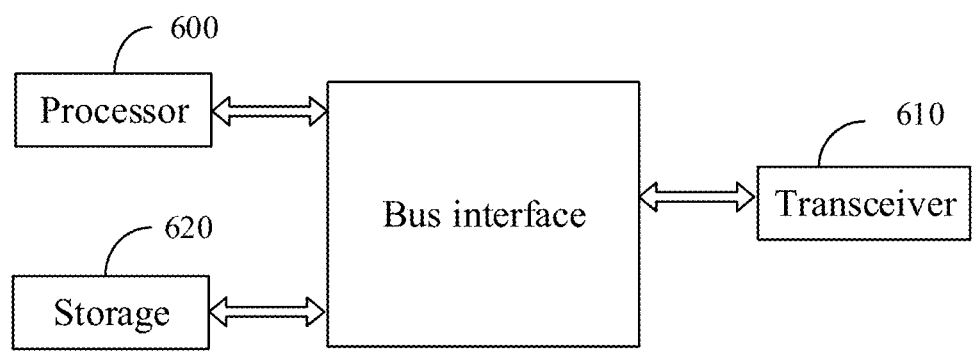
FIG. 6 is another structural diagram of a terminal provided by some embodiments of the present disclosure.

Referring to FIG. 6, FIG. 6 is another structural diagram of a terminal provided in some embodiments of the present disclosure. As shown in FIG. 6, the terminal includes a transceiver 610, a storage 620, a processor 600 and a program stored on the storage 620 and executable by the processor, wherein, the processor 600 is configured to read the program in the storage and perform a following process: determining a target CS parameter corresponding to each symbol according to an initial CS parameter and a random value associated with at least an index of a symbol, and the transceiver 610 is configured for sending a PUCCH according to the target CS parameter; or the transceiver 610 is configured for determining a target CS parameter corresponding to each symbol according to an initial CS parameter and a random value associated with at least an index of a symbol, and sending a PUCCH according to the target CS parameter.

The transceiver 610 may be configured to receive and transmit data under a control of the processor 600.

In FIG. 6, a bus architecture may include any number of interconnected buses and bridges, specifically various circuits including one or more processors represented by the processor 600 and a storage represented by the storage 620 are linked together. The bus architecture may also link together various other circuits, such as peripheral devices, voltage regulators, and power management circuits, which are well known in the art, and thus will not be described further herein. A bus interface provides an interface. The transceiver 610 may be a plurality of elements, i.e., including a transmitter and a receiver, for providing a unit for communicating with various other devices over a transmission medium.

The processor 600 is responsible for managing the bus architecture and general processing, and the storage 620 may store data used by the processor 600 when the processor 600 performs an operation.

It should be noted that the storage 620 is not limited to be arranged in the terminal only, and the storage 620 and the processor 600 may be separated from each other at different geographical locations.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a first formula, the first formula being: $n_{cs}(n_s, l)=((CS_{init}+n_{cs}^{cell}(n_s, l)) \bmod N_{sc}^{RB}$; wherein $n_{cs}^{cell}(n_s, l) = \Sigma_{i=0}^{7} c(8N_{symb}^{UL} \cdot n_s + 8l + i) \cdot 2^i$, c(i) is a pseudo-random sequence initialized with a configured ID or cell ID, $n_{cs}(n_s, l)$ is the target CS parameter corresponding to a symbol with an index l within a time unit with an index $n_s$, and $CS_{init}$ is the initial CS parameter. l is an index of a symbol within one or more time units, $n_s$ is an index of a time unit, $N_{sc}^{RB}$ is the number of subcarriers included in an RB, and $N_{symb}^{UL}$ is the number of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a second formula, the second formula being $n_{cs}(l)=(CS_{init}+n_{cs}^{cell}(l)) \bmod N_{sc}^{RB}$, wherein $n_{cs}^{cell}(l)=\Sigma_{i=0}^{7} c(8l+i) \cdot 2^i$, wherein, c(i) is the pseudo-random sequence initialized with a configured ID or cell ID, $n_{cs}(l)$ is the target CS parameter corresponding to a symbol with an index l, $CS_{init}$ is the initial CS parameter, l is the index of the symbol within one or more time units, and $N_{sc}^{RB}$ is the number of subcarriers included in an RB.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a third formula, the third formula being $$n_{cs}(n_s, l) = \left( \left\lfloor \frac{CS_{init}}{\Delta_{shift}} \right\rfloor \cdot \Delta_{shift} + n_{cs}^{cell}(n_s, l) \right) \bmod N_{sc}^{RB};$$

wherein $n_{cs}^{cell}(n_s, l) = \Sigma_{i=0}^{7} c(8N_{symb}^{UL} \cdot n_s + 8l + i) \cdot 2^i$, c(i) is the pseudo-random sequence initialized with the configured ID or cell ID, $n_{cs}(n_s, l)$ is the target CS parameter corresponding to a symbol with an index l within a time unit with an index $n_s$, $CS_{init}$ is the initial CS parameter. l is an index of a symbol within one or more time units, $n_s$ is an index of a time unit, $N_{sc}^{RB}$ is the number of subcarriers included in an RB, $\Delta_{shift}$ is a cyclic shift interval, and $N_{symb}^{UL}$ is the number of symbols included in a slot.

Optionally, determining the target CS parameter corresponding to each symbol according to the initial CS param-
eter and the random value associated with at least the index of the symbol includes: determining a target CS parameter $n_{cs}(l)$ corresponding to each symbol according to a fourth formula, the fourth formula being $$n_{cs}(l) = \left( \left\lfloor \frac{CS_{init}}{\Delta_{shift}} \right\rfloor \cdot \Delta_{shift} + n_{cs}^{cell}(l) \right) \bmod N_{sc}^{RB};$$

wherein, $n_{cs}^{cell}(l) = \Sigma_{i=0}^{7} c(8l+i) \cdot 2^i$, c(i) is a pseudo-random sequence initialized with a configured ID or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is the number of subcarriers included in an RB, and $\Delta_{shift}$ is a cyclic shift interval.

Optionally, determining the target CS parameter corresponding to each symbol according to the initial CS parameter and the random value associated with at least the index of the symbol includes: determining a target CS parameter $n_{cs}(n_s, l)$ corresponding to each symbol according to a fifth formula, the fifth formula being $n_{cs}(n_s, l)=((CS_{init} \cdot \Delta_{shift}) \bmod N_{sc}^{RB} + n_{cs}^{cell}(n_s, l)) \bmod N_{sc}^{RB}$; wherein $n_{cs}^{cell}(n_s, l) = \Sigma_{i=0}^{7} c(8N_{symb}^{UL} \cdot n_s + 8l + i) \cdot 2^i$, c(i) is the pseudo-random sequence initialized with a configured ID or cell ID, $n_{cs}(n_s, l)$, is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is the number of subcarriers included in an RB, $\Delta_{shift}$ is a cyclic shift interval, and $N_{symb}^{UL}$ is the number of symbols included in a slot.

Optionally, determining the target CS parameter corresponding to each symbol according to the initial CS parameter and the random value associated with at least the index of the symbol includes: determining a target CS parameter $n_{cs}(l)$ corresponding to each symbol according to a sixth formula, the sixth formula being $n_{cs}(l)=((CS_{init} \cdot \Delta_{shift}) \bmod N_{sc}^{RB} + n_{cs}^{cell}(l)) \bmod N_{sc}^{RB}$; wherein, $n_{cs}^{cell}(l) = \Sigma_{i=0}^{7} c(8l+i) \cdot 2^i$, c(i) is a pseudo-random sequence initialized with a configured ID or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is the number of subcarriers included in an RB, and $\Delta_{shift}$ is a cyclic shift interval.

Optionally, the time unit includes: one or more slots, or 14 symbols, or one or more subframes.

Optionally, the initial CS parameter is a CS parameter configured in advance by a network-side device to the terminal through a higher-layer signaling, or a CS parameter indicated by a network-side device through a DCI, wherein the CS parameter indicated by the DCI is a CS parameter in one of a plurality of sets configured in advance to the terminal through a higher-layer signaling.

It should be noted that the terminal described above in this embodiment may be the terminal in any embodiment of the method embodiments in the present disclosure. Any embodiment of the terminal in the method embodiments of the present disclosure can be realized by the above-described terminal in the embodiment, and the same beneficial effects are achieve, which will not be described here.

Figure 7:
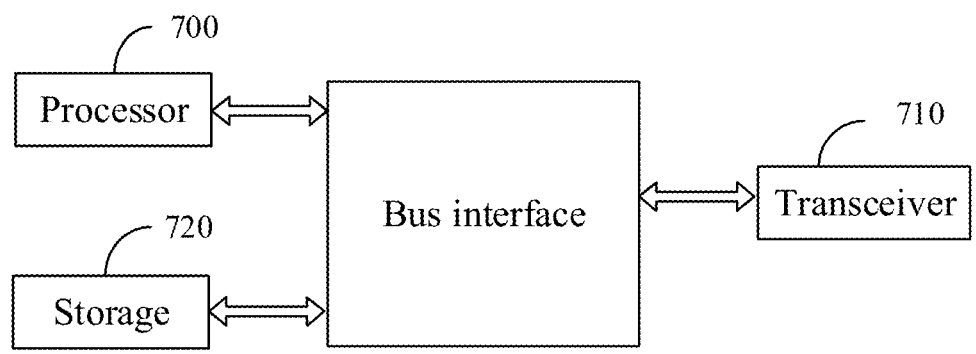
FIG. 7 is another structural diagram of a network-side device provided by some embodiments of the present disclosure.

Referring to FIG. 7, FIG. 7 is another structural diagram of a network-side device provided in some embodiments of the present disclosure. As shown in FIG. 7, the network-side device includes a transceiver 710, a storage 720, a processor 700 and a program stored on the storage 720 and executable by the processor, wherein, the processor 700 is configured to read the program in the storage and perform 啊 following process: determining a target CS parameter corresponding to each symbol according to an initial CS parameter and a random value associated with at least an index of a symbol, and the transceiver 710 is configured for receiving, according to the target CS parameter, a PUCCH sent by a terminal; or, the transceiver 710 is configured for determining a target CS parameter corresponding to each symbol according to an initial CS parameter and a random value associated with at least an index of a symbol, and receiving, according to the target CS parameter, a PUCCH sent by a terminal.

In FIG. 7, a bus architecture may include any number of interconnected buses and bridges, specifically various circuits including one or more processors represented by the processor 700 and a storage represented by the storage 720 are linked together. The bus architecture may also link together various other circuits, such as peripheral devices, voltage regulators, and power management circuits, which are well known in the art, and thus will not be described further herein. A bus interface provides an interface. The transceiver 710 may be a plurality of elements, i.e., including a transmitter and a receiver, for providing a unit for communicating with various other devices over a transmission medium.

The processor 700 is responsible for managing the bus architecture and general processing, and the storage 720 may store data used by the processor 700 when the processor 700 performs an operation.

It should be noted that the storage 720 is not limited to be arranged in the terminal only, and the storage 720 and the processor 700 may be separated from each other at different geographical locations.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a first formula, the first formula being $n_{cs}(n_s, l) = (CS_{init} + n_{cs}^{cell}(n_s, l)) \bmod N_{sc}^{RB}$; wherein $n_{cs}^{cell}(n_s, l) = \Sigma_{i=0}^{7} c(8N_{symb}^{UL} \cdot n_s + 8l + i) \cdot 2^i$, $c(i)$ is a pseudo-random sequence initialized with a configured ID or cell ID, $n_{cs}(n_s, l)$ is the target CS parameter corresponding to a symbol with an index l within a time unit with an index $n_s$, and $CS_{init}$ is the initial CS parameter. l is an index of a symbol within one or more time units, $n_s$ is an index of a time unit, $N_{sc}^{RB}$ is the number of subcarriers included in an RB, and $N_{symb}^{UL}$ is the number of symbols included in a slot.

Optionally, determining the target CS parameter corresponding to each symbol according to the initial CS parameter and the random value associated with at least the index of the symbol includes: determining the target CS parameter $n_{cs}(l)$ corresponding to each symbol according to a second formula, the second formula being $n_{cs}(l) = (CS_{init} + n_{cs}^{cell}(l)) \bmod N_{sc}^{RB}$, wherein $n_{cs}^{cell}(l) = \Sigma_{i=0}^{7} c(8l+i) \cdot 2^i$, $c(i)$ is the pseudo-random sequence initialized with a configured ID or cell ID, $n_{cs}(l)$ is the target CS parameter corresponding to a symbol with an index l, $CS_{init}$ is the initial CS parameter, l is the index of the symbol within one or more time units, and $N_{sc}^{RB}$ is the number of subcarriers included in an RB.

Optionally, determining the target CS parameter corresponding to each symbol according to the initial CS parameter and the random value associated with at least the index of the symbol includes: determining the target CS parameter $n_{cs}(n_s, l)$ corresponding to each symbol according to a third formula, the third formula being $$n_{cs}(n_s, l) = \left(\left\lfloor \frac{CS_{init}}{\Delta_{shift}} \right\rfloor \cdot \Delta_{shift} + n_{cs}^{cell}(n_s, l)\right) \bmod N_{sc}^{RB};$$

wherein $n_{cs}^{cell}(n_s, l) = \Sigma_{i=0}^{7} c(8N_{symb}^{UL} \cdot n_s + 8l + i) \cdot 2^i$, $c(i)$ is the pseudo-random sequence initialized with the configured ID or cell ID, $n_{cs}(n_s, l)$ is the target CS parameter corresponding to a symbol with an index l within a time unit with an index $n_s$, $CS_{init}$ is the initial CS parameter. l is an index of a symbol within one or more time units, $n_s$ is an index of a time unit, $N_{sc}^{RB}$ is the number of subcarriers included in an RB, $\Delta_{shift}$ is a cyclic shift interval, and $N_{symb}^{UL}$ is the number of symbols included in a slot.

Optionally, determining the target CS parameter corresponding to each symbol according to the initial CS parameter and the random value associated with at least the index of the symbol includes: determining a target CS parameter $n_{cs}(l)$ corresponding to each symbol according to a fourth formula, the fourth formula being $$n_{cs}(l) = \left(\left\lfloor \frac{CS_{init}}{\Delta_{shift}} \right\rfloor \cdot \Delta_{shift} + n_{cs}^{cell}(l)\right) \bmod N_{sc}^{RB};$$

wherein, $n_{cs}^{cell}(l) = \Sigma_{i=0}^{7} c(8l+i) \cdot 2^i$, $c(i)$ is a pseudo-random sequence initialized with a configured ID or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is the number of subcarriers included in an RB, and $\Delta_{shift}$ is a cyclic shift interval.

Optionally, determining the target CS parameter corresponding to each symbol according to the initial CS parameter and the random value associated with at least the index of the symbol includes: determining a target CS parameter $n_{cs}(n_s, l)$ corresponding to each symbol according to a fifth formula, the fifth formula being $n_{cs}(n_s, l) = ((CS_{init} \cdot \Delta_{shift}) \bmod N_{sc}^{RB} + n_{cs}^{cell}(n_s, l)) \bmod N_{sc}^{RB}$; wherein $n_{cs}^{cell}(n_s, l) = \Sigma_{i=0}^{7} c(8N_{symb}^{UL} \cdot n_s + 8l + i) \cdot 2^i$, $c(i)$ is a pseudo-random sequence initialized with a configured ID or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is the number of subcarriers included in an RB, $\Delta_{shift}$ is a cyclic shift interval, and $N_{symb}^{UL}$ is the number of symbols included in a slot.

Optionally, determining the target CS parameter corresponding to each symbol according to the initial CS parameter and the random value associated with at least the index of the symbol includes: determining a target CS parameter $n_{cs}(l)$ corresponding to each symbol according to a sixth formula, the sixth formula being $n_{cs}(l) = ((CS_{init} \cdot \Delta_{shift}) \bmod N_{sc}^{RB} + n_{cs}^{cell}(l)) \bmod N_{sc}^{RB}$; wherein, $n_{cs}^{cell}(l) = \Sigma_{i=0}^{7} c(8l+i) \cdot 2^i$, $c(i)$ is a pseudo-random sequence initialized with a configured ID or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is the number of subcarriers included in an RB, and $\Delta_{shift}$ is a cyclic shift interval.

Optionally, the time unit includes one or more slots, or 14 symbols, or one or more subframes.

Optionally, the initial CS parameter is a CS parameter configured in advance by a network-side device to the terminal through a higher-layer signaling, or a CS parameter indicated by a network-side device through a DCI, wherein the CS parameter indicated by the DCI is a CS parameter in one of a plurality of sets configured in advance to the terminal through a higher-layer signaling.

It should be noted that the network-side device described above in this embodiment may be the network-side device in any embodiment of the method embodiments in the present disclosure. Any embodiment of the network-side device in the method embodiments of the present disclosure can be realized by the above-described network-side device in the embodiment, and the same beneficial effects are achieve, which will not be described here.

Some embodiments of the present disclosure further provide a computer-readable storage medium having stored thereon a program. When the program is executed by a processor, the processor implements the steps in the PUCCH transmission method on the terminal side provided by some embodiments of the present disclosure.

Some embodiments of the present disclosure further provide a computer-readable storage medium having stored thereon a program. When the program is executed by a processor, the processor implements the steps in the PUCCH transmission method on the network-side device side provided by some embodiments of the present disclosure.

In the embodiments provided herein, it should be understood that the disclosed methods and apparatus may be implemented in other ways. For example, the device embodiments described above are merely illustrative, for example, a division to units is only a logical function division, and there may be another division in actual implementation. For example, multiple units or components may be combined or may be integrated into another system, or some features may be ignored or not performed. Additionally, coupling or direct coupling or communication connection shown or discussed with respect to each other may be an indirect coupling or communication connection through some interface, device, or unit, and may be in electrical, mechanical, or other form.

In addition, various functional units in the embodiments of the present disclosure may be integrated in one processing unit, may be separately physically included in each unit, or two or more units may be integrated in one unit. The integrated unit may be implemented either in a form of hardware or in a form of a hardware functional unit plus a software functional unit.

The integrated unit implemented in the form of the software functional unit described above may be stored in a computer-readable storage medium. The software function unit is stored in a storage medium including instructions for causing a computer device (which may be a personal computer, a server, or a network device, etc.) to perform part of the steps of receiving or sending method of the various embodiments of the present disclosure. The storage medium includes a variety of media capable of storing a program code, such as a USB disk, a mobile hard disk, a Read-Only Memory (ROM), a Random Access Memory (RAM), a magnetic disk or a compact disc.

The above are preferred embodiments of the present disclosure and it should be noted that several improvements and embellishments may also be made by those of ordinary skill in the art without departing from the principled of the present disclosure, these improvements and embellishments should also be considered to be within the protection scope of the present disclosure.

What is claimed is:

1. A physical uplink control channel (PUCCH) transmission method applied to a terminal, comprising:

determining a target cyclic shift (CS) parameter corresponding to each symbol according to an initial CS parameter and a random value associated with at least an index of the symbol; and sending a PUCCH according to the target CS parameter, wherein, determining the target CS parameter corresponding to each symbol according to the initial CS parameter and the random value associated with at least the index of the symbol comprises:

determining the target CS parameter $n_{cs}(n_s, l)$ corresponding to each symbol according to a first formula, the first formula being $n_{cs}(n_s, l)=(CS_{init}+n_{cs}^{cell}(n_s, l)) \bmod N_{sc}^{RB}$;

wherein $n_{cs}^{cell}(n_s, l)=\Sigma_{i=0}^{7} c(8N_{symb}^{UL} \cdot n_s+8l+i) \cdot 2^i$, c(i) is a pseudo-random sequence initialized with a configured identifier (ID) or cell ID, $n_{cs}(n_s, l)$ is the target CS parameter corresponding to a symbol with an index l within a time unit with an index $n_s$, and $CS_{init}$ the initial CS parameter, l is an index of a symbol within one or more time units, $n_s$ is an index of a time unit, $N_{sc}^{RB}$ is a quantity of subcarriers comprised in a Resource Block (RB), and $N_{symb}^{UL}$ is a quantity of symbols comprised in a slot;

or, determining the target CS parameter $n_{cs}(l)$ corresponding to each symbol according to a second formula, the second formula being $n_{cs}(l)=(CS_{init}+n_{cs}^{cell}(l)) \bmod N_{sc}^{RB}$;

wherein $n_{cs}^{cell}(l)=\Sigma_{i=0}^{7} c(8l+i) \cdot 2^i$, is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, and $N_{sc}^{RB}$ is a quantity of subcarriers comprised in a Resource Block (RB);

or, determining the target CS parameter $n_{cs}(n_s,l)$ corresponding to each symbol according to a third formula, the third formula being $$n_{cs}(n_s, l) = \left(\left\lfloor \frac{CS_{init}}{\Delta_{shift}} \right\rfloor \cdot \Delta_{shift} + n_{cs}^{cell}(n_s, l)\right) \bmod N_{sc}^{RB};$$

wherein $n_{cs}^{cell}(n_s, l)=\Sigma_{i=0}^{7} c(8N_{symb}^{UL} \cdot n_s+8l+i) \cdot 2^i$, c(i) is a pseudo-random sequence initialized with the configured (ID) or cell ID, $n_{cs}(n_s, l)$ is the target CS parameter corresponding to a symbol with an index e within a time unit with an index $n_s$, $CS_{init}$ is the initial CS parameter, l is an index of a symbol within one or more time units, $n_s$ is an index of a time unit, $N_{sc}^{RB}$ is a quantity of subcarriers comprised in a Resource Block (RB), $\Delta_{shift}$ is a cyclic shift interval, and $N_{symb}^{UL}$ is a quantity of symbols comprised in a slot;

or, determining the target CS parameter $n_{cs}(l)$ corresponding to each symbol according to a fourth formula, the fourth formula being $$n_{cs}(l) = \left(\left\lfloor \frac{CS_{init}}{\Delta_{shift}} \right\rfloor \cdot \Delta_{shift} + n_{cs}^{cell}(l)\right) \bmod N_{sc}^{RB};$$

wherein, $n_{cs}^{cell}(l)=\Sigma_{i=0}^{7}c(8l+i)\cdot 2^{i}$, $c(i)$ is a pseudo-random sequence initialized with a configured (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers comprised in a Resource Block (RB), and $\Delta_{shift}$ is a cyclic shift interval;

or, determining the target CS parameter corresponding to each symbol according to the initial CS parameter and the random value associated with at least the index of the symbol comprises:

determining a target CS parameter $n_{cs}(n_s, l)$ corresponding to each symbol according to a fifth formula, the fifth formula being $n_{cs}(n_s, l)=((CS_{init}\cdot\Delta_{shift})$ mod $N_{sc}^{RB}+n_{cs}^{cell}(n_s, l))$mod $N_{sc}^{RB}$;

wherein $n_{cs}^{cell}(n_s, l)=\Sigma_{i=0}^{7}c(8N_{symb}^{UL}\cdot n_s+8l+i)\cdot 2^{i}$, $c(i)$ is a pseudo-random sequence initialized with a configured (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers comprised in a Resource Block (RB), $\Delta_{shift}$ is a cyclic shift interval, and $N_{symb}^{UL}$ is a quantity of symbols comprised in a slot;

or, determining the target CS parameter $n_{cs}(l)$ corresponding to each symbol according to a sixth formula, the sixth formula being $n_{cs}(l)=((CS_{init}\cdot\Delta_{shift})$mod $N_{sc}^{RB}+n_{cs}^{cell}(l))$mod $N_{sc}^{RB}$;

wherein, $n_{cs}^{cell}(l)=\Sigma_{i=0}^{7}c(8l+i)\cdot 2^{i}$, $c(i)$ is a pseudo-random sequence initialized with a configured (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers comprised in a Resource Block (RB), and $\Delta_{shift}$ is a cyclic shift interval, wherein the initial CS parameter is a CS parameter configured in advance by a network-side device to the terminal through a higher-layer signaling, or a CS parameter indicated by a network-side device through downlink control information (DCI), wherein the CS parameter indicated by the DCI is a CS parameter in one of a plurality of sets configured in advance to the terminal through a higher-layer signaling.

2. The method according to claim 1, wherein the time unit comprises one or more slots, or 14 symbols, or one or more subframes.

3. A physical uplink control channel (PUCCH) transmission method applied to a network-side device, comprising:

determining a target cyclic shift (CS) parameter corresponding to each symbol according to an initial CS parameter and a random value associated with at least an index of a symbol; and receiving, according to the target CS parameter, a PUCCH sent by a terminal, wherein determining the target CS parameter corresponding to each symbol according to the initial CS parameter and the random value associated with at least the index of the symbol comprises:

determining the target CS parameter $n_{cs}(n_s, l)$ corresponding to each symbol according to a first formula, the first formula being $n_{cs}(n_s, l)=(CS_{init}+n_{cs}^{cell}(n_s, l))$mod $N_{sc}^{RB}$;

wherein $n_{cs}^{cell}(n_s, l)=\Sigma_{i=0}^{7}c(8N_{symb}^{UL}\cdot n_s+8l+i)\cdot 2^{i}$, $c(i)$ is a pseudo-random sequence initialized with a configured identifier (ID) or cell ID, $n_{cs}(n_s, l)$ is the target CS parameter corresponding to a symbol with an index l within a time unit with an index $n_s$, $CS_{init}$ the initial CS parameter, l is an index of a symbol within one or more time units, $n_s$ is an index of a time unit, $N_{sc}^{RB}$ is a quantity of subcarriers comprised in a Resource Block (RB), and $N_{symb}^{UL}$ is a quantity of symbols comprised in a slot;

or, determining the target CS parameter $n_{cs}(l)$ corresponding to each symbol according to a second formula, the second formula being $n_{cs}(l)=(CS_{init}+n_{cs}^{cell}(l))$ mod $N_{sc}^{RB}$, wherein $n_{cs}^{cell}(l)=\Sigma_{i=0}^{7}c(8l+i)\cdot 2^{i}$, is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, and $N_{sc}^{RB}$ is a quantity of subcarriers comprised in a Resource Block (RB);

or, determining the target CS parameter $n_{cs}(n_s, l)$ corresponding to each symbol according to a third formula, the third formula being $$n_{cs}(n_s, l) = \left(\left\lfloor\frac{CS_{init}}{\Delta_{shift}}\right\rfloor\cdot\Delta_{shift} + n_{cs}^{cell}(n_s, l)\right)\mathrm{mod}N_{sc}^{RB};$$

wherein $n_{cs}^{cell}(n_s, l)=\Sigma_{i=0}^{7}c(8N_{symb}^{UL}\cdot n_s+8l+i)\cdot 2^{i}$, $c(i)$ is a pseudo-random sequence initialized with the configured (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers comprised in a Resource Block (RB), $\Delta_{shift}$ is a cyclic shift interval, and $N_{symb}^{UL}$ is a quantity of symbols comprised in a slot;

or, determining the target CS parameter $n_{cs}(l)$ corresponding to each symbol according to a fourth formula, the fourth formula being $$n_{cs}(l) = \left(\left\lfloor\frac{CS_{init}}{\Delta_{shift}}\right\rfloor\cdot\Delta_{shift} + n_{cs}^{cell}(l)\right)\mathrm{mod}N_{sc}^{RB};$$

wherein, $n_{cs}^{cell}(l)=\Sigma_{i=0}^{7}c(8l+i)\cdot 2^{i}$, $c(i)$ is a pseudo-random sequence initialized with a configured (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers comprised in a Resource Block (RB), and $\Delta_{shift}$ is a cyclic shift interval;

or, determining the target CS parameter corresponding to each symbol according to the initial CS parameter and the random value associated with at least the index of the symbol comprises:

determining a target CS parameter $n_{cs}(n_s, l)$ corresponding to each symbol according to a fifth formula, the fifth formula being $n_{cs}(n_s,l)=((CS_{init}\cdot\Delta_{shift})$ mod $N_{sc}^{RB}+n_{cs}^{cell}(n_s,l))$mod $N_{sc}^{RB}$;

wherein $n_{cs}^{cell}(n_s, l)=\Sigma_{i=0}^{7}c(8N_{symb}^{UL}\cdot n_s+8l+i)\cdot 2^i$, c(i) is a pseudo-random sequence initialized with a configured (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers comprised in a Resource Block (RB), $\Delta_{shift}$ is a cyclic shift interval, and $N_{symb}^{UL}$ is a quantity of symbols comprised in a slot;

or, determining the target CS parameter $n_{cs}(l)$ corresponding to each symbol according to a sixth formula, the sixth formula being $n_{cs}(l)=((CS_{init}\cdot\Delta_{shift})$mod $N_{sc}^{RB}+n_{cs}^{cell}(l))$mod $N_{sc}^{RB}$;

wherein, $n_{cs}^{cell}(l)=\Sigma_{i=0}^{7}c(8l+i)\cdot 2^i$, c(i) is a pseudo-random sequence initialized with a configured (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers comprised in a Resource Block (RB), and $\Delta_{shift}$ is a cyclic shift interval, wherein, the initial CS parameter is a CS parameter configured in advance by the network-side device to the terminal through a higher-layer signaling, or a CS parameter indicated by the network-side device through downlink control information (DCI), wherein the CS parameter indicated by the DCI is a CS parameter in one of a plurality of sets configured in advance to the terminal through a higher-layer signaling.

4. The method according to claim 3, wherein the time unit comprises one or more slots, or 14 symbols, or one or more subframes.

5. A terminal, comprising: a transceiver, a storage, a processor, and a program stored on the storage and executable by the processor, wherein, the transceiver is configured to send and/or receive information under a control of the processor, the processor is configured to read the program on the storage and perform a physical uplink control channel (PUCCH) transmission method, the method comprises:

determining a target cyclic shift (CS) parameter corresponding to each symbol according to an initial CS parameter and a random value associated with at least an index of the symbol; and sending a PUCCH according to the target CS parameter, wherein, determining the target CS parameter corresponding to each symbol according to the initial CS parameter and the random value associated with at least the index of the symbol comprises:

determining the target CS parameter $n_{cs}(n_s, l)$ corresponding to each symbol according to a first formula, the first formula being $n_{cs}(n_s, l)=(CS_{init}+n_{cs}^{cell}(n_s, l))$mod $N_{sc}^{RB}$;

wherein $n_{cs}^{cell}(n_s, l)=\Sigma_{i=0}^{7}c(8N_{symb}^{UL}\cdot n_s+8l+i)\cdot 2^i$, c(i) is a pseudo-random sequence initialized with a configured identifier (ID) or cell ID, $n_{cs}(n_s, l)$ is the target CS parameter corresponding to a symbol with an index l within a time unit with an index $n_s$, and $CS_{init}$ the initial CS parameter, l is an index of a symbol within one or more time units, $n_s$ is an index of a time unit, $N_{sc}^{RB}$ is a quantity of subcarriers comprised in a Resource Block (RB), and $N_{symb}^{UL}$ is a quantity of symbols comprised in a slot;

or, determining the target CS parameter $n_{cs}(l)$ corresponding to each symbol according to a second formula, the second formula being $n_{cs}(l)=(CS_{init}+n_{cs}^{cell}(l))$ mod $N_{sc}^{RB}$, wherein $n_{cs}^{cell}(l)=\Sigma_{i=0}^{7}c(8l+i)\cdot 2^i$, is a pseudo-random sequence initialized with a configured identifier (ID) or cell ID, $n_{cs}(l)$ is the target CS parameter corresponding to a symbol with an index l, $CS_{init}$ is the initial CS parameter, l is an index of a symbol within one or more time units, and $N_{sc}^{RB}$ is a quantity of subcarriers comprised in a Resource Block (RB);

or, determining the target CS parameter $n_{cs}(n_s,l)$ corresponding to each symbol according to a third formula, the third formula being $$n_{cs}(n_s, l) = \left(\left\lfloor \frac{CS_{init}}{\Delta_{shift}} \right\rfloor \cdot \Delta_{shift} + n_{cs}^{cell}(n_s, l)\right) \mathrm{mod} N_{sc}^{RB};$$

wherein $n_{cs}^{cell}(n_s, l)=\Sigma_{i=0}^{7}c(8N_{symb}^{UL}\cdot n_s+8l+i)\cdot 2^i$, c(i) is a pseudo-random sequence initialized with the configured (ID) or cell ID, $n_{cs}(n_s, l)$ is the target CS parameter corresponding to a symbol with an index e within a time unit with an index $n_s$, $CS_{init}$ is the initial CS parameter, l is an index of a symbol within one or more time units, $n_s$ is an index of a time unit, $N_{sc}^{RB}$ is a quantity of subcarriers comprised in a Resource Block (RB), $\Delta_{shift}$ is a cyclic shift interval, and $N_{symb}^{UL}$ is a quantity of symbols comprised in a slot;

or, determining the target CS parameter $n_{cs}(l)$ corresponding to each symbol according to a fourth formula, the fourth formula being $$n_{cs}(l) = \left(\left\lfloor \frac{CS_{init}}{\Delta_{shift}} \right\rfloor \cdot \Delta_{shift} + n_{cs}^{cell}(l)\right) \mathrm{mod} N_{sc}^{RB};$$

wherein, $n_{cs}^{cell}(l)=\Sigma_{i=0}^{7}c(8l+i)\cdot 2^i$, c(i) is a pseudo-random sequence initialized with a configured (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers comprised in a Resource Block (RB), and $\Delta_{shift}$ is a cyclic shift interval;

or, determining the target CS parameter corresponding to each symbol according to the initial CS parameter and the random value associated with at least the index of the symbol comprises:

determining a target CS parameter $n_{cs}(n_s, l)$ corresponding to each symbol according to a fifth formula, the fifth formula being $n_{cs}(n_s, l)=((CS_{init} \cdot \Delta_{shift}) \bmod N_{sc}^{RB} + n_{cs}^{cell}(n_s, l)) \bmod N_{sc}^{RB}$;

wherein $n_{cs}^{cell}(n_s, l) = \Sigma_{i=0}^{7} c(8N_{symb}^{UL} \cdot n_s + 8l + i) \cdot 2^i$, c(i) is a pseudo-random sequence initialized with a configured (ID) or cell ID, $n_{cs}(n_s, l)$ is the target CS parameter corresponding to a symbol with an index l within a time unit with an index $n_s$, $CS_{init}$ is the initial CS parameter, l is an index of a symbol within one or more time units, $n_s$ is an index of a time unit, $N_{sc}^{RB}$ is a quantity of subcarriers comprised in a Resource Block (RB), $\Delta_{shift}$ is a cyclic shift interval, and $N_{symb}^{UL}$ is a quantity of symbols comprised in a slot;

or, determining the target CS parameter $n_{cs}(l)$ corresponding to each symbol according to a sixth formula, the sixth formula being $n_{cs}(l)=((CS_{init} \cdot \Delta_{shift}) \bmod N_{sc}^{RB} + n_{cs}^{cell}(l)) \bmod N_{sc}^{RB}$;

wherein, $n_{cs}^{cell}(l) = \Sigma_{i=0}^{7} c(8l+i) \cdot 2^i$, c(i) is a pseudo-random sequence initialized with a configured (ID) or cell ID, $n_{cs}(l)$ is the target CS parameter corresponding to a symbol with an index l, $CS_{init}$ is the initial CS parameter, l is an index of a symbol within one or more time units, $N_{sc}^{RB}$ is a quantity of subcarriers comprised in a Resource Block (RB), and $\Delta_{shift}$ is a cyclic shift interval, wherein the initial CS parameter is a CS parameter configured in advance by a network-side device to the terminal through a higher-layer signaling, or a CS parameter indicated by a network-side device through downlink control information (DCI), wherein the CS parameter indicated by the DCI is a CS parameter in one of a plurality of sets configured in advance to the terminal through a higher-layer signaling.

6. The terminal according to claim 5, wherein, the time unit comprises one or more slots, or 14 symbols, or one or more subframes.

7. A network-side device, comprising a transceiver, a storage, a processor, and a program stored on the storage and executable by the processor, wherein, the transceiver is configured to send and/or receive information under a control of the processor, the processor is configured to read the program on the storage and perform the method according to claim 3.

8. The network side device according to claim 7, wherein, the time unit comprises one or more slots, or 14 symbols, or one or more subframes.

* * * * *